United States Patent
Han et al.

(10) Patent No.: US 6,802,690 B2
(45) Date of Patent: Oct. 12, 2004

(54) OUTLET SILENCER STRUCTURES FOR TURBINE

(75) Inventors: Ming Hui Han, Mississauga (CA); Muammer Yazici, Toronto (CA)

(73) Assignee: M & I Heat Transfer Products, Ltd., Mississauga (CA)

(*) Notice: Subject to any disclaimer, the term of this patent is extended or adjusted under 35 U.S.C. 154(b) by 0 days.

(21) Appl. No.: 10/301,279

(22) Filed: Nov. 21, 2002

(65) Prior Publication Data

US 2003/0072648 A1 Apr. 17, 2003

Related U.S. Application Data

(63) Continuation-in-part of application No. 09/867,982, filed on May 30, 2001, now Pat. No. 6,537,490.

(51) Int. Cl.[7] ................................................ F01D 25/04
(52) U.S. Cl. .................... 415/119; 415/183; 415/208.1; 181/224; 239/265.13; 138/37
(58) Field of Search ............................. 415/119, 183, 415/208.1, 211.2; 181/224, 225, 229, 217–18; 239/265.13, 370; 138/37–39; 381/71.4–7

(56) References Cited

U.S. PATENT DOCUMENTS

| | | | |
|---|---|---|---|
| 2,308,886 A | * | 1/1943 | Mason |
| 2,916,101 A | * | 12/1959 | Maman |
| 2,994,401 A | | 8/1961 | Bourne et al. |
| 3,174,581 A | * | 3/1965 | Duthion et al. |
| 3,187,835 A | * | 6/1965 | Smith |
| 3,435,911 A | | 4/1969 | Greenheck |
| 3,511,336 A | | 5/1970 | Rink et al. |
| 3,715,009 A | * | 2/1973 | Smith et al. .................. 181/33 |
| 3,762,498 A | * | 10/1973 | May et al. ..................... 181/50 |
| 4,002,023 A | | 1/1977 | Hartmann |
| 4,362,223 A | * | 12/1982 | Meier .......................... 181/206 |
| 4,573,551 A | * | 3/1986 | Schwerdtner et al. ........ 181/218 |
| 5,168,699 A | | 12/1992 | McCarty et al. |
| 5,340,276 A | * | 8/1994 | Norris et al. ............. 415/208.1 |
| 5,473,124 A | * | 12/1995 | Yazici et al. ................. 181/224 |
| 5,532,439 A | * | 7/1996 | Minkin ......................... 181/224 |
| 5,603,604 A | * | 2/1997 | Norris et al. ............. 415/208.1 |
| 5,715,672 A | * | 2/1998 | Schockemoehl et al. ...... 60/39.5 |

(List continued on next page.)

FOREIGN PATENT DOCUMENTS

| | | |
|---|---|---|
| EP | 0632192 A1 | 1/1995 |
| FR | 1496841 | 10/1967 |
| FR | 2447069 | 8/1980 |
| GB | 1423986 | 2/1976 |
| JP | 61049134 | 3/1986 |

Primary Examiner—Edward K. Look
Assistant Examiner—J. M. McAleenan
(74) Attorney, Agent, or Firm—Young & Basile, P.C.

(57) ABSTRACT

Both air duct inlet silencers and air duct outlet silencers for use with a stationary gas turbine are disclosed. The sound attenuating duct unit suitable for connecting to an outlet of a stationary gas turbine includes a housing having a horizontal housing section and a vertical housing section and having sidewalls surrounding a main airflow passageway that extends along a substantial bend. An air inlet is located at one end of the horizontal housing section and is adapted for connection to the outlet of the gas turbine. Preferably two air outlets are located proximate to an upper end of the vertical housing section. Splitters are mounted in the housing, and they divide sections of the main airflow passageway into smaller air passageways. At least one of the splitters is positioned upstream in the main airflow passageway relative to other splitters. The splitters contain sound attenuating material capable of withstanding airflow temperatures in the main airflow passageway of at least 500 degrees Celsius. At least a substantial portion of both the sidewalls surrounding the main airflow passageway and metal sidewalls forming the splitters are made of perforated sheet metal.

35 Claims, 16 Drawing Sheets

U.S. PATENT DOCUMENTS

| | | | |
|---|---|---|---|
| 5,728,979 A | * 3/1998 | Yazici et al. | 181/224 |
| 6,049,615 A | 4/2000 | Chou et al. | |
| 6,056,084 A | * 5/2000 | Schockemoehl et al. | 181/224 |
| 6,260,658 B1 | * 7/2001 | Darrellel et al. | 181/224 |
| 6,263,998 B1 | * 7/2001 | Schockemoehl et al. | 181/293 |
| 6,332,510 B1 | * 12/2001 | Frederiksen et al. | 181/256 |
| 6,332,511 B1 | * 12/2001 | Parlato et al. | 181/282 |

\* cited by examiner

OUTLET SILENCER STRUCTURES FOR TURBINE

This is a continuation-in-part application of U.S. patent application Ser. No. 09/867,982 filed May 30, 2001 now U.S. Pat. No. 6,537,490.

BACKGROUND OF THE INVENTION

This invention relates to air duct outlet silencers, and in particular to silencers designed for use with gas turbines and other noise-creating, gas flow-producing devices.

Stationary gas turbines for the production of power are well known for use by power producing industries. One difficulty that is encountered with the use of gas turbines is the noise that they can create during their operation. Because of this noise, efforts have been made in the past to provide sound attenuators or sound reducing devices both at the intake of the gas turbine and at the outlet end. However for various reasons problems have been encountered in developing satisfactory inlet silencing units and outlet silencing devices for these gas turbines. One reason for these difficulties is that the flow into and out of stationary gas turbines is often compromised because of spacial constraints and cost factors. Many such systems feature a short plenum box with a vertical inflow into the compressor of the turbine and an axial outflow. In the usual case, inlet silencers are installed ahead of the plenum while the gas turbine outlet is often dumped into a plenum which feeds a vertical exhaust section consisting of some form of silencer and exhaust stack.

Outside of the field of gas turbines, both air duct inlet silencers and air duct outlet silencers have been developed in recent years for use in combination with axial fans providing air to large structures such as office buildings and industrial buildings. For example U.S. Pat. No. 5,587,563 issued Dec. 24, 1996 to Dipti K. R. Datta describes both an air inlet silencer for an axial fan and an air outlet silencer, both of which employ sound attenuating material located behind perforated sheet metal walls. The duct inlet silencer includes an exterior housing that has two principal air inlets located on opposite sides of the housing. The unit also has a single air outlet located at one end of the housing. The two inlets and the outlet are connected by airflow passageways defined by interior walls and these passageways bend 90 degrees from the inlets to the outlet. Sections of the interior walls are made from the aforementioned perforated sheet metal. In one preferred embodiment the passageway from each inlet is divided into four quadrants with upper and lower quadrants separated by a horizontal divider.

With respect to the fan outlet silencer described in the aforementioned U.S. patent, it has a top, bottom, and sidewalls and between these walls extend first and second series of splitters with the splitters of each series being spaced apart to form smaller air passageways. The splitters of each series are mounted side by side in a row and the splitters of one series are staggered with respect to the splitters of the other series in a direction transverse to the direction of airflow. The sound attenuating material that is used in both the inlet silencer and the outlet silencer for an axial fan as described in this U.S. patent is standard sound attenuating material such as fibreglass bats stuffed between the interior walls and the exterior walls and into the interior of the splitters.

Up to the present time, there has been no suggestion that inlet and outlet silencers of this general type could be used in combination with relatively large, stationary gas turbines. One difficulty with the known outlet silencers designed for use with ordinary axial fans is that they are not able to withstand the high temperatures that exist in the hot air stream emitted by the gas turbine nor are they able to withstand the much higher air velocities which can be as much as 15000 feet/minute and higher.

In the air handling art wherein systems have been developed for providing fresh air and return air to structures using suitable fans, it is known that turning vanes to redirect the direction of the airflow into or out of a fan unit can provide excellent turning performance including uniform airflow with minimum pressure loss. The use of such turning vanes in combination with sound attenuating material has proven to be effective in air supplying and air conditioning applications involving the use of axial fan units. Most of these systems employ conventional acoustic dissipative media such as fibreglass. In many of these recently developed systems the sound absorbing surface comprises a special sandwich construction consisting of a perforated cover sheet, an erosion resistant duct-liner and bulk fibre located behind the duct liner and packed to the proper density. However as far as applicant is aware, this sound attenuating technology has in general not been used with nor proposed for use with gas turbines such as large, stationary gas turbines used for the production of power.

It is an object of the present invention to provide a novel sound attenuating duct unit suitable for connection to the outlet of a stationary gas turbine or other noise-creating, gas flow-producing device, this unit being capable of manufacture at a reasonable cost while having substantial sound attenuating capabilities.

SUMMARY OF THE INVENTION

According to one aspect of the invention, a sound attenuating duct unit suitable for connecting to an outlet of a stationary gas turbine includes a housing having a horizontal housing section and a vertical housing section and having sidewalls surrounding a main airflow passageway that extends along a substantial bend. An air inlet is located at one end of the horizontal housing section and is adapted for connection to the outlet of the gas turbine. At least one air outlet is located at least proximate to an upper end of the vertical housing section. At least two splitters are mounted in the housing. The splitters divide sections of the main airflow passageway into smaller air passageways. At least one of the at least two splitters is positioned downstream in the main airflow passageway relative to at least another of the at least two splitters. The at least two splitters contain sound attenuating material selected from a group of materials comprising ceramic fibers and mineral wool and capable of withstanding airflow temperatures in the main airflow passageway of at least 500 degrees Celsius. The at least two splitters each contain a fine metal screen having 200 or more strands per inch and covering the sound attenuating material. The metal screen is provided to prevent the sound attenuating material from escaping the splitters. At least a substantial portion of both the sidewalls surrounding the main airflow passageway and metal sidewalls forming the splitters are made of perforated sheet metal having a thickness of at least 12 gauge.

In one embodiment of this outlet silencer for a turbine, the perforated sheet metal is made of stainless steel.

According to another aspect of the invention, there is provided a combination of a gas turbine intended for installation and use at a selected stationary site and a sound attenuating duct unit connected to a hot air exhaust outlet of the gas turbine. The duct unit includes a housing having a horizontal housing section and a vertical housing section and having sidewalls surrounding a main airflow passageway that extends along a substantial bend. There is an air inlet located at one end of the horizontal housing section and connected to the exhaust outlet of the gas turbine. At least one air outlet is located at least proximate to an upper end of the vertical housing section. The combination also includes at least two splitters mounted in the housing. The splitters divide sections of the main airflow passageway into smaller air passageways. At least one of the at least two splitters is positioned downstream in the main airflow passageway relative to at least another of the at least two splitters. The splitters contain sound attenuating material selected from a group of materials comprising mineral wool and ceramic fibers and capable of withstanding airflow temperatures in the main airflow passageway of at least 500 degrees Celsius. A layer of fine stainless steel screen having 200 or more strands per inch is arranged over the sound attenuating material so as to prevent escape of sound attenuating material into the main airflow passageway. Also at least a substantial portion of both the sidewalls surrounding the main airflow passageway and metal sidewalls forming the splitters are made of perforated sheet metal. The screen is arranged behind the perforated sheet metal of the splitters.

In a preferred embodiment of this combination each splitter includes a rounded nose portion, and this nose portion is made of imperforate stainless steel.

According to a further aspect of the invention, a sound attenuating duct unit suitable for connection to an outlet of a stationary gas turbine includes a housing having metal exterior walls, perforated interior walls forming a main airflow passageway and mounted and supported by the exterior walls, a hot gas inlet at one end of the housing and adapted for connection to the outlet of the gas turbine, and at least one gas outlet. The main airflow passageway extends between the gas inlet and the at least one outlet. Sound attenuating members are mounted within the main airflow passageway and are supported therein by the housing. Sound attenuating material is arranged in the housing between the interior walls and the exterior walls and is capable of withstanding high airflow temperatures generated at the outlet of the gas turbine during use thereof. Metal mounting plates having outer edges connected to the exterior walls and inner edges connected to the interior walls are also provided. Spaced apart connecting pins are attached to these mounting plates, project from at least one of the inner edges and the outer edges and extend through oversized holes that are larger than the widths of the respective pins. The holes are formed in at least one of the interior walls and the exterior walls. An attachment device is provided for movably connecting each connecting pin to the at least one of the interior walls and the exterior walls. When the interior walls are heated to an elevated high temperature by operation of the gas turbine, the interior walls are able to expand and move relative to the exterior walls while remaining securely attached to and supported by the exterior walls via the connecting pins and the metal mounting plates.

Preferably, the connecting pins project from the inner edges of the mounting plates and the mounting plates are rigidly attached to the exterior walls of the housing. In this version, the oversized holes are formed in the interior walls.

According to yet another embodiment of the invention, a sound attenuating duct unit suitable for connection to an outlet for hot emission gases produced by a power plant includes a metal housing formed with sidewalls containing sound attenuating material capable of withstanding high airflow temperatures and forming a main airflow passageway for the hot emission gases. The housing has a gas inlet at one end of the housing and at least one air outlet at an opposite end of the housing. The airflow passageway extends between the gas inlet and the at least one gas outlet. The side walls of the housing include exterior wall panels and perforated interior wall panels spaced apart from the exterior panels. The sound attenuating material is sandwiched between the exterior wall panels and the interior panels. At least one elongate sound attenuating splitter is mounted in the main airflow passageway and extends between and is supported by two of the side walls located on opposite sides of the housing. This splitter divides the main airflow passageway into smaller airflow passageways. The or each splitter contains sound attenuating material and has an exterior constructed with perforated sheet metal. Splitter mounting devices connect opposite sides of the at least one splitter directly to the the exterior wall panels so as to allow thermal expansion of the at least one splitter when the duct unit is heated up by the hot emission gases during operation of the power plant.

In the preferred embodiment, each splitter mounting device comprises a bracket rigidly attached to a respective adjacent side wall of the housing and having an inwardly projecting tongue. The or each splitter has side edge plates provided with elongate openings receiving the tongues of the respective brackets for the splitter. Each tongue is movable relative to its respective elongate opening upon thermal expansion of the adjacent attached splitter.

According to a further embodiment of the invention, a sound attenuating duct unit suitable for connecting to an outlet of a noise creating, gas-flow producing device includes a housing having a horizontal housing section and a vertical housing section and having sound attenuating side walls surrounding a main airflow passageway that extends along a substantial bend. A gas inlet is located at one end of the horizontal housing section and is adapted for connection to the outlet of the gas flow producing device. At least one gas outlet is located at least proximate to an upper end of the vertical housing section. At least one initial, sound attenuating splitter is mounted in the housing and has an upstream end in the region of the gas inlet. This at least one splitter extends lengthwise around the substantial bend. A plurality of spaced-apart, sound attenuating, downstream splitters divide the main air flow passageway into smaller airflow passageways and are arranged side-by-side one another. The downstream splitters are located downstream in the direction of gas flow from the at least one initial splitter and have major lower portions extending in substantially parallel planes that are substantially perpendicular to a central widthwise-extending plane defined by an upper end portion of the at least one initial sound attenuating splitter.

In one preferred embodiment, there is only one initial sound attenuating splitter which is arranged substantially centrally in the main airflow passageway and there are three of the downstream splitters. Each of these splitters contain sound attenuating material capable of withstanding gas flow temperatures of at least 500 degrees Celsius.

Further features and advantages will become apparent from the following detailed description of preferred embodiments taken in conjunction with the accompanying drawings.

DETAILED DESCRIPTION OF PREFERRED EMBODIMENTS

Figure 1:
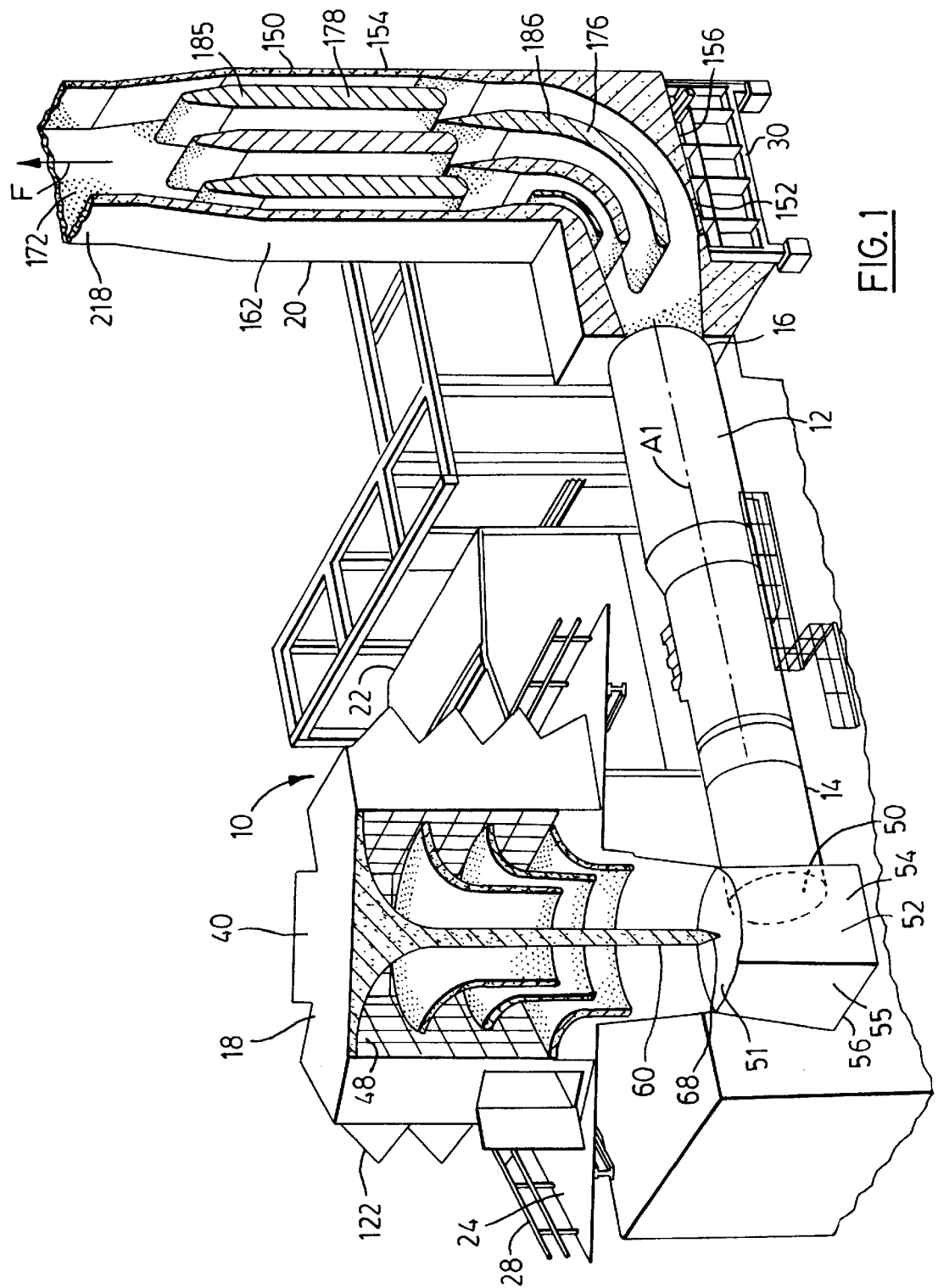
FIG. 1 is a schematic illustration of a gas turbine power installation equipped with an air duct inlet silencing apparatus and an air duct outlet silencer constructed in accordance with the invention with both the inlet silencer and the outlet silencer shown in cross section for purposes of illustration.

FIG. 1 is a schematic illustration of a power generating installation 10 wherein power is generated by a stationary gas turbine indicated generally at 12. This gas turbine extends horizontally as illustrated and it has an inlet or intake section at 14 and an outlet located at 16 at the opposite end of the turbine. Connected to the intake of the turbine is a preferred form of air duct inlet silencing apparatus 18. It will be understood that substantial quantities of air can be drawn into the intake of the turbine via airflow passageways formed in the inlet silencer 18. Hot air or gas exiting from the turbine through the outlet 16 passes through a sound attenuating structure or duct unit indicated generally at 20. It will be understood that a major function of both the inlet silencer 18 and the outlet duct unit 20 is to reduce the amount of noise emanating from the gas turbine so that the noise level surrounding this installation is reduced to an acceptable level both for personnel working at the installation and others, such as people living or working close to the facility. Although the illustrated inlet and outlet duct silencers are shown in combination with a gas turbine, it will be appreciated that silencers constructed in accordance with one or more aspects of the invention can also be used with other noise-creating, gasflow-producing devices, for example, large air handling fans, including axial fans.

Some of the other features shown in FIG. 1 in whole or in part include a building 22 which houses and protects the gas turbine and which can, for example, shelter equipment and personnel used to maintain and operate the installation. Also shown is a platform 24 which extends around the inlet silencer 18 and which provides access for operating personnel to the inlet components such as filter and heat exchanging coils. Access to the platform 24 can be gained by means of a stairways 26. One version of the platform and stairways can be seen in FIG. 2. For safety reasons, a guide rail or fence 28 can extend around the outer edge of the platform.

With respect to the outlet silencer, a suitable supporting framework 30 can be provided below and around the outlet silencer in order to support same.

Figure 4:
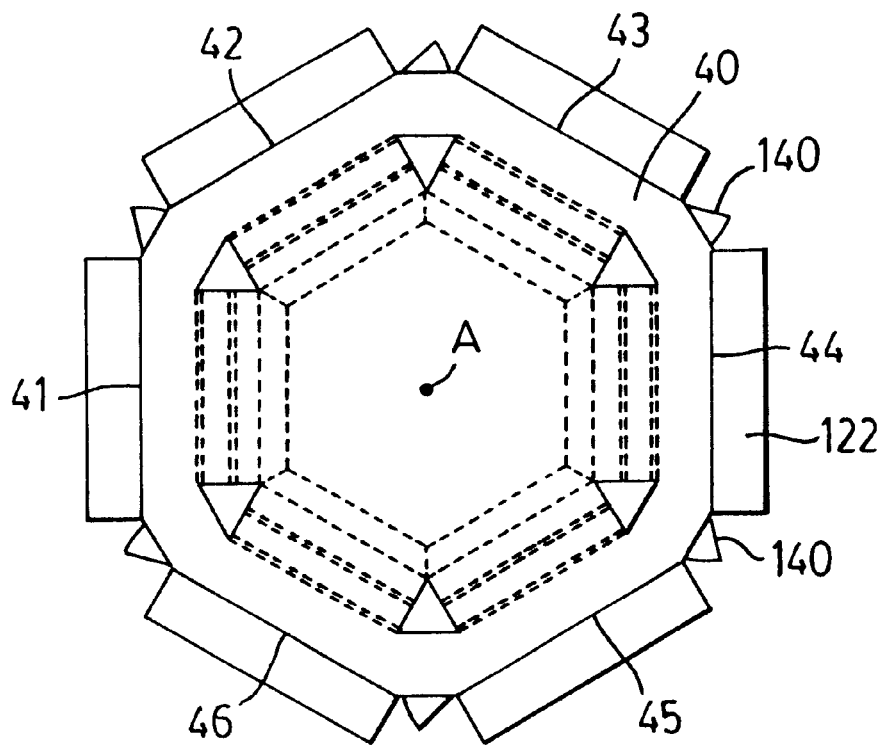
FIG. 4 is a plan view of the inlet silencer of FIG. 3, this view showing the six sides of a preferred embodiment.

Turning now to the construction of the inlet silencer 18, as will be apparent from the foregoing, this silencing apparatus is designed for use with the stationary gas turbine 12 and the illustrated silencer can either be mounted outdoors where it will be exposed to the elements or it can be installed within a suitable building or structure. The silencing apparatus 18 includes a vertically extending duct structure 34 having an upper duct section 36 with a plurality of vertically extending sides and a top cover or roof 40 which can comprise a horizontally extending panel such as a sheet metal panel. As indicated by FIG. 4 in one particularly preferred embodiment of the inlet silencer there are in fact six vertically extending sides 41 to 46, these sides preferably being of equal width and height and extending about a central vertical axis located at A. It is also possible to construct the inlet silencer with sides of unequal width, if required by the particular installation or job site. It will be appreciated that the number of sides can be less than six, for example four sides or five sides and the actual number of sides in the structure can depend in some extent on the installation's requirement, the amount of space available, and from which side the incoming air will be entering during use of the apparatus. It will be understood that there are air inlet openings 48 formed in some or all of the vertically extending sides 41 to 46 and these openings can cover substantially all of their respective vertical sides. Assuming that there are no obstructions or adjacent structures that prevent air from entering the inlet silencer on all sides, there can normally be inlet openings 48 on all of the vertically extending sides of the structure. However there may for example be a blocking wall or other obstruction on one or more sides of the inlet silencer that prevent air from entering from these particular sides and, in such cases, there may be air inlet openings in only one, two or more but not all of the vertically extending sides. Described hereinafter are versions of the invention wherein there are inlet openings in only one side and also wherein there are inlet openings in only two sides.

An air outlet 51 is formed at a bottom end of the duct structure and this air outlet is adapted for connection to an air intake plenum 52 of the gas turbine. In the illustrated preferred embodiment, the air outlet 50 from the plenum 52 is located in a vertical plane and it has a shape, for example circular, conforming to the shape of the intake 14. The air outlet 50 can be formed on one vertical side of the air intake plenum 52 having a pair of substantially vertical sidewalls 54, an open top, and an end wall 55 and a bottom which meet at a corner 56 which can be square as shown or can be rounded. If the corner at 56 is rounded, this helps to smoothly redirect the incoming airflow from vertically downwardly to the horizontal direction. If desired, suitable turning vanes (not shown) can be arranged in the corner section 52 to assist in redirecting the airflow to the horizontal direction.

Figure 3:
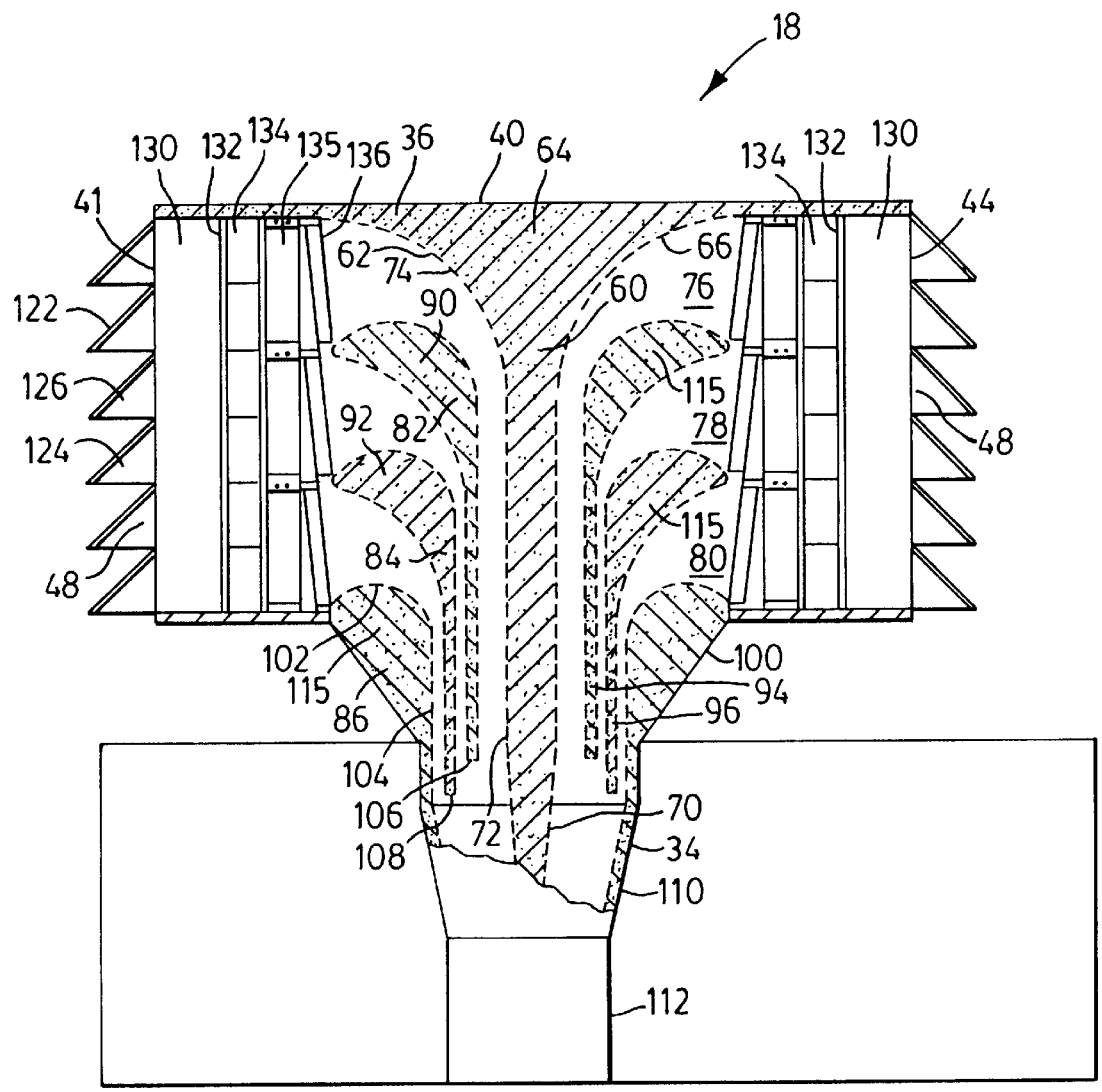
FIG. 3 is a cross-sectional elevation of the air duct inlet silencer of the invention, this view being taken along the vertical central axis of the inlet silencer.

The inlet silencer 18 also includes an elongate, centrally located airflow defining member 60 which is substantially cylindrical or multi-sided for a major portion of its length and which extends downwardly from the top cover 40 and past the air inlet openings 48. As used in this specification, in describing the member 60 and its shape, the term "cylindrical" includes a multi-sided exterior that is elongate and similar to a cylindrical shape in its transverse cross-section. This airflow defining member is formed with a perforated sheet metal exterior indicated at 62 and the airflow defining member contains sound attenuating material 64. The extent of the perforated sheet metal in a preferred embodiment of the member 60 can be seen from FIG. 3. As indicated in this figure, preferably the sheet metal extends over substantially the entire height of the airflow defining member including the outwardly curved section 66 but not including the top cover 40 which is not in contact with the incoming airflow. The perforated sheet metal can extend substantially to the pointed bottom end 68 of the member 60. Also shown in FIG. 3 is a tapered bottom section 70 that extends downwardly to the bottom end 60 from the central cylindrical section 72. It is also possible to construct the central airflow defining member 60 without the tapered bottom section 70. As shown in the drawings, above the central section 72 is a substantially frusto-conical upper portion 74 wherein, in vertical, transverse cross section as shown in FIG. 3, the exterior sheet metal wall is concavely curved. This frusto-conical upper portion extends downwardly from the top cover 40 to the cylindrical section 72. This frusto-conical upper portion 74 can either be round in horizontal cross-section or it can be multi-sided. This upper portion can also be described as sloping downwardly and inwardly.

Figure 2:
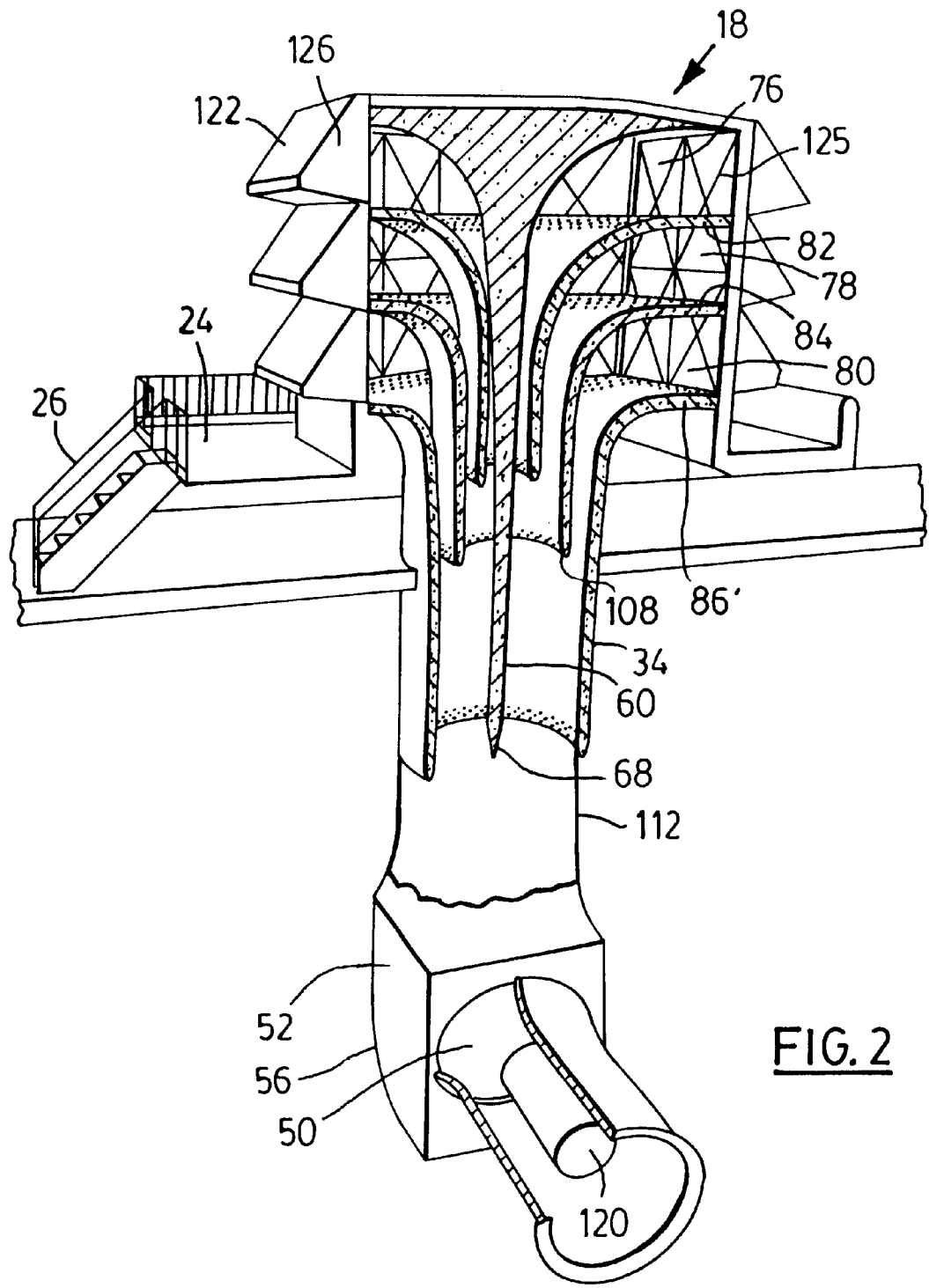
FIG. 2 is a perspective view in cross section showing a preferred form of air duct inlet silencer with the cross section of the inlet silencer itself being taken in a vertical plane.

The version of the inlet silencer 18 of FIGS. 1 to 3 includes two or more annular airflow passageways extending from the air inlet openings 48 towards the air outlet of the silencer with each passageway being defined by at least one interior wall mounted in the duct structure. As shown in FIGS. 1 to 3, these airflow passageways each bend substantially so that a bottom section thereof extends substantially vertically. In the illustrated preferred embodiment there are three of these annular passageways 76, 78 and 80. With respect to the passageway 76, it is defined by the sheet metal exterior 62 of the airflow defining member 60 on one side and by the interior wall 82 on the opposite or outer side. With respect to the airflow passageway 78, this passageway is defined by the interior wall 82 on one side, that is the upper or inner side, and by an interior wall 84 on the opposite or outer side. With respect to the bottommost annular passageway 80, it is defined by the interior wall 84 and an annular wall structure 86. It will be noted that FIGS. 2 and 3 show different versions of the interior walls 82,84 and of the annular wall structure 86. In the version of FIG. 2, the two interior walls 82,84 are of substantially uniform thickness and their thickness corresponds to the thickness of annular wall structure 86'. This uniform thickness is due to the fact that both inner and outer surfaces of the curved section of each of these interior walls and the wall structure 86' have the same center of curvature.

However in the embodiment of FIGS. 1 and 3, the interior walls 82,84 vary in their thickness with each having a relatively thick upper section at 90 and 92 and a relatively thin, cylindrical or multi-sided lower portion indicated at 94 and 96. Each of the upper sections 90,92 commences at a point and then the two sides of the wall section diverge to the widest point of the wall section before again converging to the cylindrical or multi-sided section 94 or 96. It will thus be seen that the radius of curvature on one side of the upper section 90 or 92 is smaller than on the opposite or bottom side. It will be appreciated that this arrangement provides for the use of a maximum amount of sound attenuating material in the upper region of the inlet silencer resulting in excellent sound attenuating ability. The annular wall structure 86 shown in FIG. 3 has an inwardly sloping exterior surface at 100 which is made of imperforate sheet metal while the interior surface of this structure has a curved upper portion 102 which leads smoothly to a cylindrical or multi-sided lower portion 104. Both of these portions of the interior surface are preferably constructed from perforated sheet metal. The annular wall structure 86 can alternatively be constructed in the manner shown in FIG. 1 wherein the exterior of the lower portion is cylindrical.

Also it will be seen from FIGS. 2 and 3 that the bottom end of the interior walls 82,84 can terminate at different heights and at a height above the bottom end 68 of the airflow defining member 60. In particular the bottom end 106 of the innermost interior wall 82 can be above the bottom end 108 of the interior wall 84. Both of these bottom ends are substantially above the bottom end 68. Also in the version of FIG. 3, the conical bottom section 70 of the airflow defining member 60 extends into a transition duct section 110 which, in the illustrated version tapers inwardly in the downwards direction and connects to a rectangular duct section 112. It is also possible to construct the transition duct section 110 so that it does not have a tapered exterior. In the duct section 110, the horizontal cross-section of the airflow passageway is changed in a manner known per se from circular or multi-sided (at the top) to rectangular.

It will be further understood that each of the interior walls 82,84 is filled with sound attenuating material indicated at 115. This material can comprise compressed bats of fibreglass or mineral wool, for example. Also the annular wall structure at 86 is filled with sound attenuating material 115. It will also be understood that the central and lower sections of the member 60 and the interior walls 82,84 are rigidly supported by suitable supporting frames or struts (not shown) that are connected thereto and that do not materially interfere with the incoming airflows. These narrow struts can be connected at their outer ends to walls located radially outwardly from the member 60 or the interior wall.

The thick upper sections 90,92 of the two interior walls are connected to corresponding upper sections on the adjacent sides of the silencer and thus together they form multi-sided upper sections of the interior walls. This can be seen more clearly from FIG. 4. The upper sections can also be substantially conical as illustrated in FIG. 2 where the upper sections of the interior walls have a substantially uniform thickness.

Also as illustrated in FIGS. 1 and 2, it will be seen that the air duct inlet structure includes the aforementioned air intake plenum 52 which is a form of duct elbow that, in the illustrated embodiment, bends approximately 90 degrees.

Returning to the gas turbine that is connected to the outlet of the air inlet silencer 18, it will be seen from FIG. 1 that this turbine is elongate and it will be appreciated that it has a central longitudinal axis indicated by the dash line A1 in FIG. 1 about which the blades of the gas turbine rotate during use thereof. Thus in the power generating installation illustrated in FIG. 1, the central longitudinal axis A1 of the gas turbine is substantially horizontal and is substantially perpendicular to the central longitudinal axis A of the airflow defining member 60.

If desired, an optional feature of the intake 14 for the turbine is a central, sound attenuating bullet 120 which can have a cylindrical exterior and which can be filled with sound attenuating material and covered with perforated sheet metal. Suitable, radially extending struts (not shown), that do not interfere with the airflow, can be used to mount this central bullet which also helps to reduce the amount of sound being emitted from the intake end of the turbine.

If the inlet silencer 18 is to be mounted in the open, which would generally be the case because of its size, the upper section thereof is constructed so as to provide some protection from the elements including rain and snow. Shown in the drawings are a series of weather hoods 122 which can be arranged over the inlet openings 48. Thus if inlet openings are arranged on all sides of the inlet silencer, these hoods are mounted on all of the sides. Each hood can have a steeply sloping panel 124 and arranged at each end of this panel are vertically extending end walls 126 that connect the ends of the panel 124 to supporting framework 125 (see FIG. 2) for the upper section of the inlet silencer. Preferably there is a narrow corridor 130 arranged just inside the hoods, this corridor allowing maintenance personnel to gain access to the filters of the inlet silencer. Covering the inner wall of this corridor in a preferred embodiment is a prefilter 132 which can be relatively thin. If desired or if required by the particular installation, a plurality of so called final filters 134 can be stacked one on top of the other adjacent the prefilter 132. It will be understood that these filters, if used can extend the entire width and height of the inlet openings 48. Immediately downstream of the filters, there can be arranged a heat exchanger such as an evaporative cooler 135 and there can be several of these cooler units arranged one above the other to cover the entire height of the inlet openings. Preferably, just downstream of the cooler are several drift eliminators 136 which can be generally of standard construction and which help prevent any moisture from entering the airflow passageways 76, 78, and 80.

An additional preferred feature shown in FIG. 4 is the use of one of or a plurality of access doors 140. As illustrated, there is one such door for each corner where two sides of the inlet silencer meet. These doors provide access to the aforementioned corridor 130.

As shown in FIG. 4, the internal walls 82, 84 as seen in horizontal cross section are not circular but rather are multi-sided. In the case of the preferred embodiment shown in FIG. 4, these internal walls are six sided. Because of this, these internal walls and also the wall structure 86 which is also multi-sided are relatively easy to build as the curved, perforated metal panels used to make these walls need only be curved in one direction. It also becomes relatively easy to weld adjacent panel sections together to form a complete internal wall 82 or 84 or the lower wall structure 86.

In one preferred embodiment of the inlet silencer 18 as illustrated in FIG. 3, the width of the corridor 130 is about 2 feet and generally the width should be as narrow as possible. The thickness of the preferred pre-filter is 2" and can range up to 4" while the final filter can have a thickness of about 12". Although not illustrated, the inlet silencer can be fitted with a standard drain pan located just downstream of the cooler coils 135 to permit condensation from the coils and from the drift eliminators to drain out. A detailed description of this drain pan herein is deemed unnecessary as such draining pans are well known in the heat exchanging art.

Figure 5:
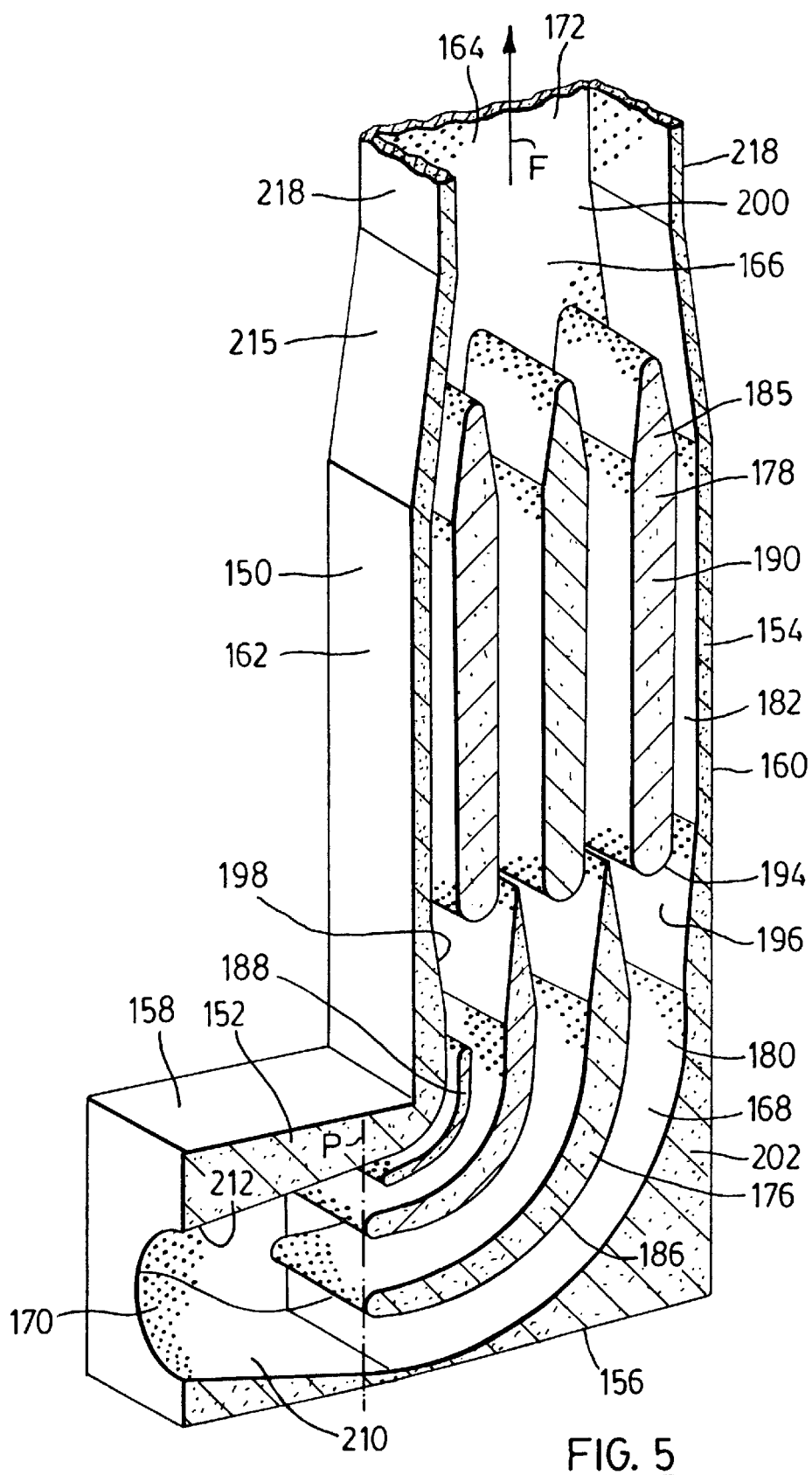
FIG. 5 is a perspective cross-sectional view of a first embodiment of an air duct outlet silencer construction in accordance with the invention, this view being taken in a vertical plane extending through the horizontal central axis of the inlet portion of the silencer.

Reference will now be made to FIGS. 1 and 5 which illustrate a first embodiment of a sound attenuating structure 20 suitable for the outlet of the gas turbine. As indicated, it is also possible to use an outlet duct silencer constructed in accordance with one or more aspects of this invention in combination with a power plant unit other than a gas turbine or in combination with a noise-creating, gas flow-producing device such as a fan, for example, a large axial fan. With particular reference to FIG. 5, the outlet silencer, which is shown along a vertical cross section, has a housing 150 that includes a horizontal housing section 152 and a vertical housing section 154. This housing can have flat, exterior sidewalls as shown in FIG. 5 including horizontal bottom wall 156, a shorter horizontal wall 158 and vertical sidewalls including walls 160, 162 and 164. It will be appreciated that there is another sidewall (not shown) that extends vertically and that is located opposite the sidewall 164. These sidewalls surround a main airflow passageway 166 that extends along a substantial bend, such as the illustrated 90 degree bend at 168. There is an air inlet 170 located at one end of the horizontal housing section and adapted for connection to the outlet of the gas turbine 12 or other gasflow-producing device. There is also an air outlet 172 located at upper end of the vertical housing section.

Located within the main airflow passageway 166 are at least a first or initial series 176 and a second series 178 of splitters with the splitters of each series being spaced apart to form smaller air passageways 180, 182 and being mounted side-by-side in a row. The second series 178 is positioned downstream relative to the direction of airflow or gasflow in the main airflow passageway 166 relative to the first series 176 and is staggered relative to the first series in a direction generally transverse to the direction of airflow indicated by the arrow F in FIGS. 1 and 5. As illustrated the second series of splitters has three, straight elongate splitters 185 while the first series has two curved, relatively large splitters 186 and an inside, smaller splitter or turning vane 188. It will be understood that this duct silencer can be made with fewer or more splitters in each of these series, if desired or required. For example, there can be a single splitter 186 that extends around the 90 degree bend either with or without the turning vane 188 which need not contain sound attenuating material. As is known per se in the sound attenuating art for air handling ducts, each of the larger splitters 185, 186 contains sound attenuating material indicated at 190. However in order that the outlet silencer 20 and the splitters mounted therein can withstand the high temperatures of the airflow exiting from the turbine, the sound attenuating material is not made from standard fibreglass bats, but is a material capable of withstanding these high airflow temperatures of at least 500 degrees Celsius or more. The preferred sound attenuating material for this purpose is ceramic fiber or mineral wool because of their reasonable cost. The exterior of the splitters is substantially formed by perforated sheet metal and is preferably stainless steel. Of course, if the outlet duct silencer will not be subject to high temperature gasflows, such as when used downstream of an air handling fan, then standard fiberglass bats can be used.

Figure 6:
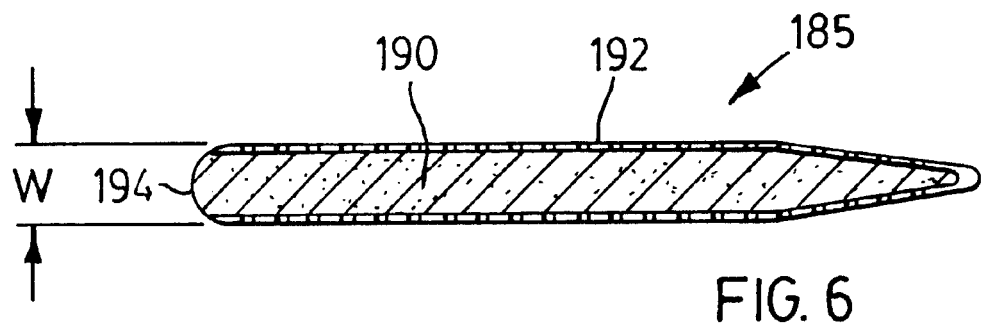
FIG. 6 is a transverse cross-section of an elongate splitter used in the outlet silencer of FIG. 5.

Shown in FIG. 6 is one of the large splitters 185. Illustrated in this figure is the preferred feature of a layer of stainless steel screen 192 which is arranged directly behind the perforated sheet metal, this screen helping to prevent the escape of the sound attenuating material through the holes in the perforated sheet metal. The preferred screen 192 is a very fine mesh SS screen having 200 to 240 strands per inch. The SS strands or threads have a diameter of only about $\frac{1}{1000}$th inch. Instead of using this metal screen, it is also possible to encapsulate the sound attenuating material in woven fiber bags. Also shown is the semi-cylindrical bottom end 194 of the splitter and preferably this bottom end is covered with imperforate sheet metal, again preferably stainless steel.

As shown both in FIGS. 1 and 5, the first series of splitters 176 extends through a substantial bend, this bend normally corresponding to the bend in the main airflow passageway which, in the illustrated embodiment is a bend of 90 degrees. This substantial bend is in the direction extending from the leading edge of these splitters to the trailing edge thereof. It will be also noted that in the embodiment of FIG. 5, both series of splitters extend transversely across the passageway from one side thereof to the opposite side and their opposite side edges are connected to the walls of the outlet silencer.

Another feature that can be seen from FIG. 5 is that the inner sides of the aforementioned sidewalls of the outlet silencer are also made from perforated sheet metal panels including the panels indicated at 196, 198 and 200. Arranged between the interior panels and the exterior metal panels that form the sidewalls of the outlet silencer is further insulating sound attenuating material indicated at 202. Again, as was the case with the splitters, this material must be capable of withstanding airflow temperatures of at least 500 degrees Celsius and more and the preferred sound attenuating material is ceramic fiber or mineral wool. Also, unlike previously known sound attenuating units used for reducing sound from axial fans, if the duct unit is for use downstream of a gas turbine, the perforated metal itself must generally be made thicker in order to withstand the much higher temperatures in the airflow. In particular both the inner surfaces of the sidewalls forming the main airflow passageway and the perforated metal sidewalls forming the splitters are made from perforated sheet metal having a thickness of at least 12 gauge. With the use of this thicker sheet metal, the panels covering the splitters and the interior surfaces of the sidewalls will have less tendency to bend and distort when their temperatures become elevated. Also all of the metal components that are exposed to the hot air stream are constructed so as to allow for quick expansion when exposed to high temperature gradients within a few seconds of turbine start-up.

The horizontal housing section 152 includes a duct transition section formed by interior wall panels including panels 210 and 212. This transition section extends approximately between the aforementioned air inlet 170 which is circular and approximately a transverse plane along the main airflow passageway (located at P) where leading edges of the first series of splitters are positioned. It will be understood that the transverse cross section of the main airflow passageway in this section changes gradually from circular to rectangular.

As shown in FIG. 5, there is also a transition section adjacent the top of the second series of splitters. In this transition section, the sidewalls 160, 162 taper inwardly in the upwards direction. Each sidewall then becomes vertical again at 218. It is also possible to taper the sidewall 164 inwardly at this transition section along with its opposite wall, if desired. It will be understood that the top air outlet 172 can be connected to a suitable emission stack extending vertically upwardly therefrom.

Preferably the stainless steel sheet metal that is used to construct the exterior of the splitters and the interior sidewalls has an open area of at least 30% of the total sheet area. Also, in FIGS. 1 and 5, the individual width of most smaller air passageways 180, 182 is about equal to the transverse width W (see FIG. 6) of an adjacent splitter.

With respect to the use of stainless steel in the outlet silencer, it will be appreciated that use of this relatively expensive metal is normally only required in those regions of the outlet silencer that experience high temperatures i.e. in excess of 500 degrees Celsius. In substantially cooler areas such as the exterior surfaces of the outlet silencer, imperforate, galvanized sheet metal can be used.

In a one embodiment of the outlet silencer employing mineral wool, the insulation is packed to a density of about 6 pounds per cubic foot in order to obtain good sound attenuation characteristics.

It will be appreciated that the 12 gauge sheet metal that is used in an outlet silencer for a gas turbine, which is close to $\frac{1}{8}$" thick, is approximately double the thickness that has been used in the past with inlet and outlet silencers designed for axial fans. Such previously known outlet silencers commonly use 16 gauge perforated sheet metal, having a thickness of approximately $\frac{1}{16}$".

As indicated, mineral wool is a preferred sound attenuating material because of its low cost and its ability to withstand high temperatures. Other sound attenuating materials which can be used for this purpose but which are more expensive include ceramic fibers and silica fibers.

Figure 7:
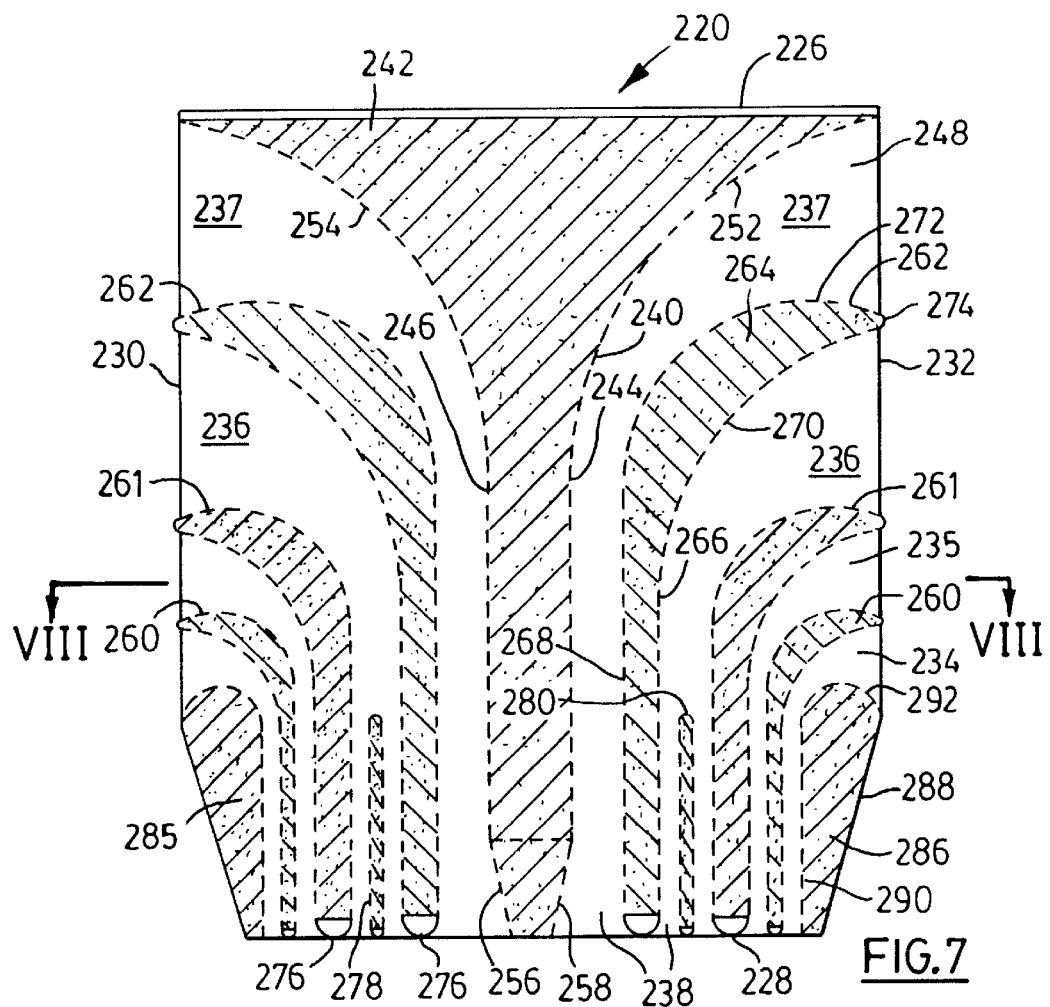
FIG. 7 is a cross-sectional elevation taken along the line VII—VII of FIG. 8 illustrating an air duct silencing apparatus having air inlets on two opposite sides thereof.
Figure 8:
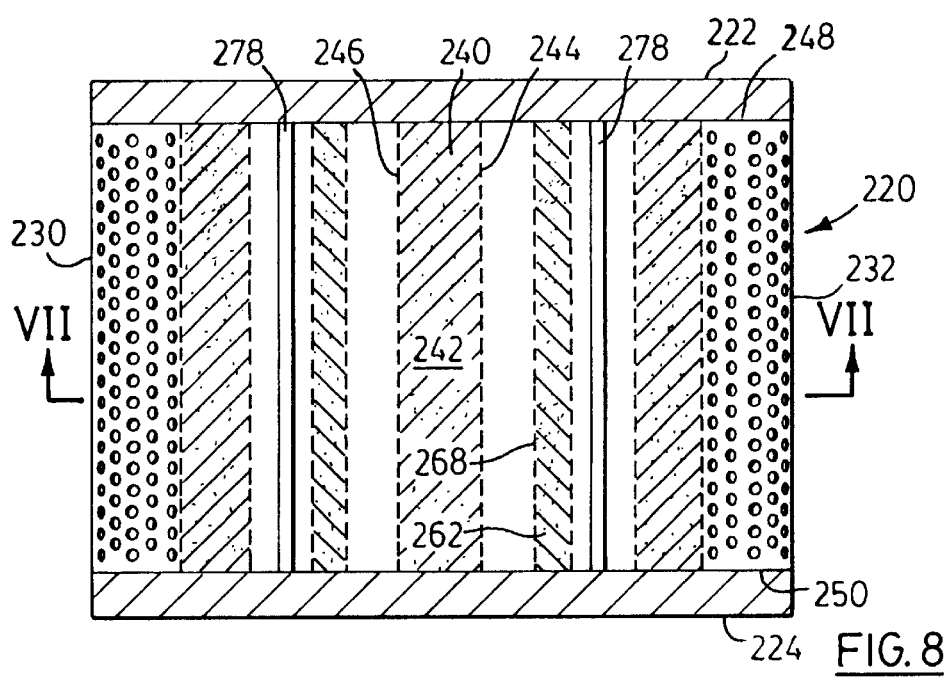
FIG. 8 is a horizontal cross-section of the same air duct silencing apparatus taken along the line VIII—VIII of FIG. 7.

FIGS. 7 and 8 illustrate another embodiment of an air duct inlet silencing apparatus. This silencing apparatus indicated generally at 220 also comprises a vertically extending duct structure that can be used to provide an airflow into the intake of a stationary turbine. It will be understood that this silencing apparatus 220 can be mounted on top of an air intake plenum such as the plenum 52 illustrated in FIG. 1 or FIG. 2 of the drawings. It would take the place of the air duct silencing apparatus that is located above the plenum 52 in FIGS. 1 and 2. The illustrated silencing apparatus 220 has four vertically extending sides with two of these sides indicated at 222 and 224 being completely enclosed and two of the sides being substantially open to allow airflow into the apparatus. The apparatus 220 has a horizontal top cover 226 which can be formed of imperforate sheet metal, such as galvanized steel. The illustrated apparatus has a rectangular bottom 228 which can be suitably constructed for mounting on the aforementioned air inlet plenum 52 or for mounting on a transition duct (if required). There preferably are a plurality of inlet openings located on two opposing sides 230, 232 of the apparatus. As illustrated, there are four openings 234 to 237 on each of these sides. As illustrated there are a number of slit-like air outlets 238 formed in the bottom of the structure and, as indicated, these outlets are adapted for connection to an air intake of a gas turbine such as that illustrated in FIG. 1. It will be appreciated by one skilled in the art that the vertically extending sides of the apparatus 220 can be extended downwardly from the bottom location shown in FIG. 7 and, if this is done, the apparatus 220 can effectively have a single air outlet formed in its bottom end as the internal, airflow splitting members, described hereinafter, can be made so as to terminate above the bottom of the apparatus and above the single outlet.

The silencing apparatus 220 like the silencing apparatus of FIGS. 1 and 2 also has an elongate centrally located airflow defining member 240 which extends downwardly from the top cover and pass the air inlet openings 234 to 237. The member 240 has its exterior formed with perforated sheet metal and it contains sound attenuating material 242. However, unlike the central airflow defining member of FIGS. 1 and 2, the member 240 has a lower section with opposing, planar, vertical walls 244 and 246. These walls extend substantially from one side of the apparatus to the opposite side as indicated in FIG. 8. These perforated, sheet metal walls can extend to vertical, interior walls 248 and 250 which can also be perforated, if desired. Extending upwardly from these planar wall sections are curved, upper wall sections 252 and 254, which, as illustrated, are cylindrical arcs that extend upwardly through a bend of almost 90 degrees, terminating at the top cover. If desired, there can also be short, inwardly tapering wall sections 256 and 258 extending downwardly from the planar walls 244, 246.

The apparatus 220 is also formed with interior walls or splitters 260 to 262, these interior walls being provided in pairs with a wall of each pair located on a respective side of the central airflow defining member 240. Although these interior walls vary in size as shown in FIG. 7, they are each of similar construction. Therefore it will suffice herein to describe one of the interior walls 262. Each of these interior walls 260 to 262 is filled with sound attenuating material 264. The lower section of each wall 262 has opposing, perforated planar sheet metal panels indicated at 266 and 268. These planar wall sections extend from the aforementioned interior wall 248 to the opposite interior wall 250. Located above these planar sections are curved upper sections 270 and 272 which can also be made of perforated sheet metal. These curved upper sections terminate approximately at the adjacent air inlet openings and, in the region of these openings, they converge to meet at a horizontally extending, leading edge 274. If desired, the bottom of each of these interior walls can be formed with a semi-cylindrical bottom piece 276 which, as illustrated, is located at the level of the aforementioned outlets 238. If desired, there can also be short interior dividing walls or splitters, two of which are indicated at 278 and these can be formed with opposing planar sides and a rounded front at 280. The opposing planar sides of these walls can also be perforated and these short interior walls are also filled with sound attenuating material.

The silencing apparatus 220 is formed with two insulated outer wall sections 285 and 286 which extend between the aforementioned interior walls 248, 250. The exterior surface of these walls is made of imperforate sheet metal 288 and it will be seen that these planar sheet metal panels can slope inwardly at a small acute angle to the vertical plane. The inner surface of these walls is formed with perforated sheet metal and each inner surface includes a planar section 290 that extends upwardly from the bottom of the apparatus to a semi-cylindrical top section 292. Each inlet opening 234 is located between the curved upper section 292 and the lowermost interior wall 260 adjacent thereto.

Figure 9:
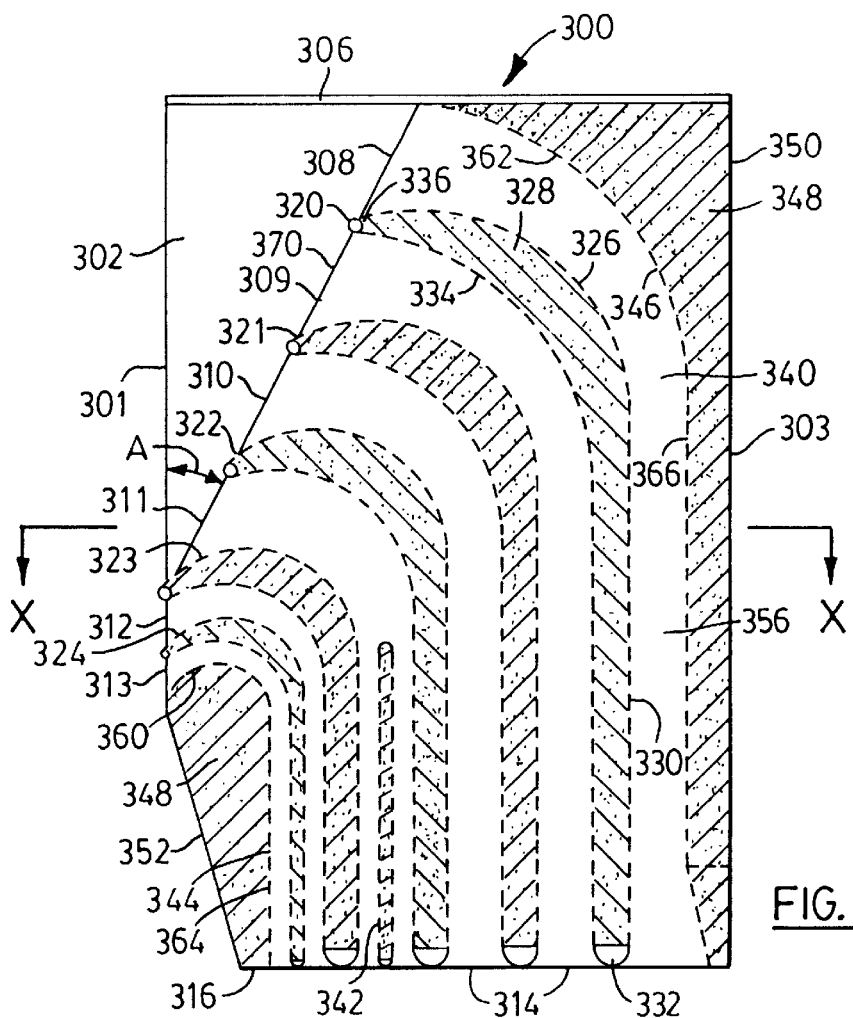
FIG. 9 is a cross-sectional elevation taken along the line IX—IX of FIG. 10 illustrating another embodiment of an air duct silencing apparatus having air inlets opening on one side only of the apparatus.
Figure 10:
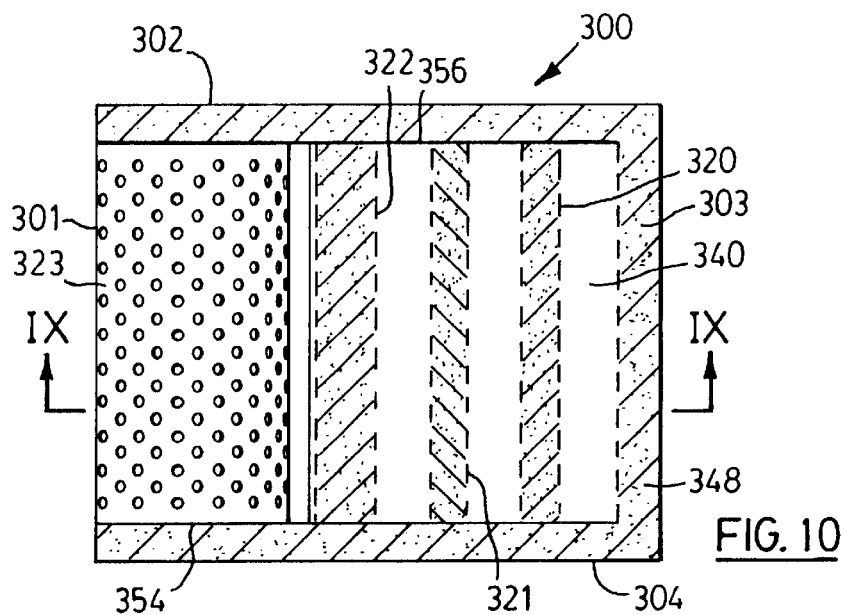
FIG. 10 is a horizontal cross-section of the apparatus of FIG. 9 taken along the line of X—X of FIG. 9.

Turning now to the further embodiment of an air duct silencing apparatus which is illustrated in FIGS. 9 and 10, this silencing apparatus is indicated generally at 300 and will be understood that this apparatus is also for use at an inlet of a stationary gas turbine such as the turbine illustrated in FIG. 1. It will be further understood that the apparatus illustrated in FIGS. 9 and 10 can be the upper duct duct section of a vertically extending duct structure that includes, for example, an air inlet plenum such as the plenum 52 illustrated in FIGS. 1 and 2. The upper duct section 300 as illustrated has four vertically extending sides including three enclosed sides indicated at 302 to 304. The silencing apparatus 300 further includes a top cover 306 which can be rectangular and made of imperforate galvanized sheet metal. In this duct structure are a plurality of inlet openings that are located on one of the vertically extending sides of the structure. As illustrated, there are six of these openings identified by references 308 to 313 with the opening 308 being adjacent top cover 306 and the opening 313 being the lowermost opening. As shown in FIG. 9, the size of these openings can vary with the bottommost openings 312, 313 in the illustrated embodiment being substantially smaller than the uppermost openings 308 to 311. Thus the side 301 of the silencing apparatus is an open side to a substantial extent. Also, the apparatus illustrated in FIGS. 9 and 10 has a plurality of air outlets 314 formed at the bottom end 316 thereof. However, it will be apparent to those skilled in the art that the exterior sidewalls of the apparatus 300 can readily be extended downwardly from the location shown and beyond the bottom of the curved airflow splitters (described below) so that there is in effect a single air outlet (or only two or three outlets) formed at the bottom of the structure. In any event, the outlet or outlets 314 are adapted for connection to an air intake of the gas turbine, for example, by means of the aforementioned air inlet plenum 52.

Arranged within the silencing apparatus 300 are a plurality of curved airflow splitters that separate the inlet openings 308 to 313 and that extend inwardly and downwardly from these inlet openings towards the air outlet or air outlets. In the illustrated embodiment there are five of these airflow splitters indicated at 320 to 324. As these splitters are each of similar construction in the illustrated preferred embodiment, it will be sufficient herein to describe the construction of the uppermost splitter 320. Each of these splitters is formed with a perforated sheet metal exterior indicated generally at 326 and is filled with sound attenuating material 328. Each splitter, including the splitter 320 has an elongate, vertically extending planar section 330, the bottom of which is located at the bottom 316 of the apparatus. This planar section can terminate with a semi-cylindrical bottom edge member 332 if desired. Extending upwardly from the planar section is a substantially curved upper section 334, the curved sides of which converge at the inlet openings to meet at a front edge 336 which extends horizontally.

There are a plurality of airflow passageways 340 that are formed by and between the airflow splitters in the silencing apparatus 300. The airflow passageways extend from the inlet openings 308 to 313 towards the air outlet or air outlets. As shown in FIG. 9, these airflow passageways bend substantially and an elongate section of each passageway extends substantially vertically. It will be understood that the number of airflow splitters will vary but, generally speaking, in a preferred embodiment of this silencing apparatus 300 there are at least three of the airflow splitters. Smaller splitters such as the illustrated splitter 342 can be provided in one or more of the main airflow passageways if desired. The smaller splitter 342 is relatively thin and it has only flat sides with no curved upper section. The inclusion of a smaller splitter of this type may be desirable in some installations in order to provide an improved, more uniform airflow from the air outlet and to provide improved sound attenuation.

The illustrated silencing apparatus 300 also has two interior walls indicated at 344 and 346 which originally mounted in the duct structure on opposite sides of the airflow passageways. These two interior walls are also formed with perforated sheet metal and sound attenuating material 348 is arranged between each of these interior walls and adjacent exterior sidewall 350, 352 of the duct structure. These two interior walls extend across the width of the silencing apparatus from vertically extending interior wall 354 to vertically extending interior wall 356 (see FIG. 10). Sound attenuating material can also be provided behind the interior walls 354, 356. Each of the interior walls 344, 346 has a substantially curved upper wall section 360, 362 and a planar lower wall section 364, 366 which extends vertically downwardly from its corresponding upper wall section. The curved upper wall section 360 can have a semi-cylindrical shape as shown in FIG. 9.

A preferred feature of the silencing apparatus 300 is the arrangement of the inlet openings 308 to 311 as illustrated in FIG. 9. These inlet openings which constitute most of the inlet opening area are arranged substantially in a first plane indicated at 370 which extends at an acute angle to a vertical plane defined by the vertically extending side 301. The first plane 370 slopes upwardly and inwardly towards a center of the top cover 306. With this arrangement, the larger, upper openings are protected to some extent from the elements by the top cover 306 and the sides 302 and 304. The top cover 306 tends to prevent rain from falling into the inlet openings 308 to 311 and thus prevents this water from being drawn into the airflow passageways and eventually into the turbine intake. Of course, it is also possible to provide a weather hood similar to the weather hoods 122 illustrated in FIG. 3 on the silencing apparatus 300. For example a weather hood could be attached to the edge of the top cover 306 at the side 301, thereby effectively extending the protection of the top cover.

It will be appreciated by those skilled in the air handling art that the inlet silencer 18 of the present invention is able to provide the advantages of a low pressure drop in the airflow and smooth transitions from low to high speed flow, the latter being at the entrance of the gas turbine. The low pressure drop is achieved with good aerodynamic design with gradual contraction and expansion in the duct profiles and with uniform air distribution across the filters and coils.

Figure 11:
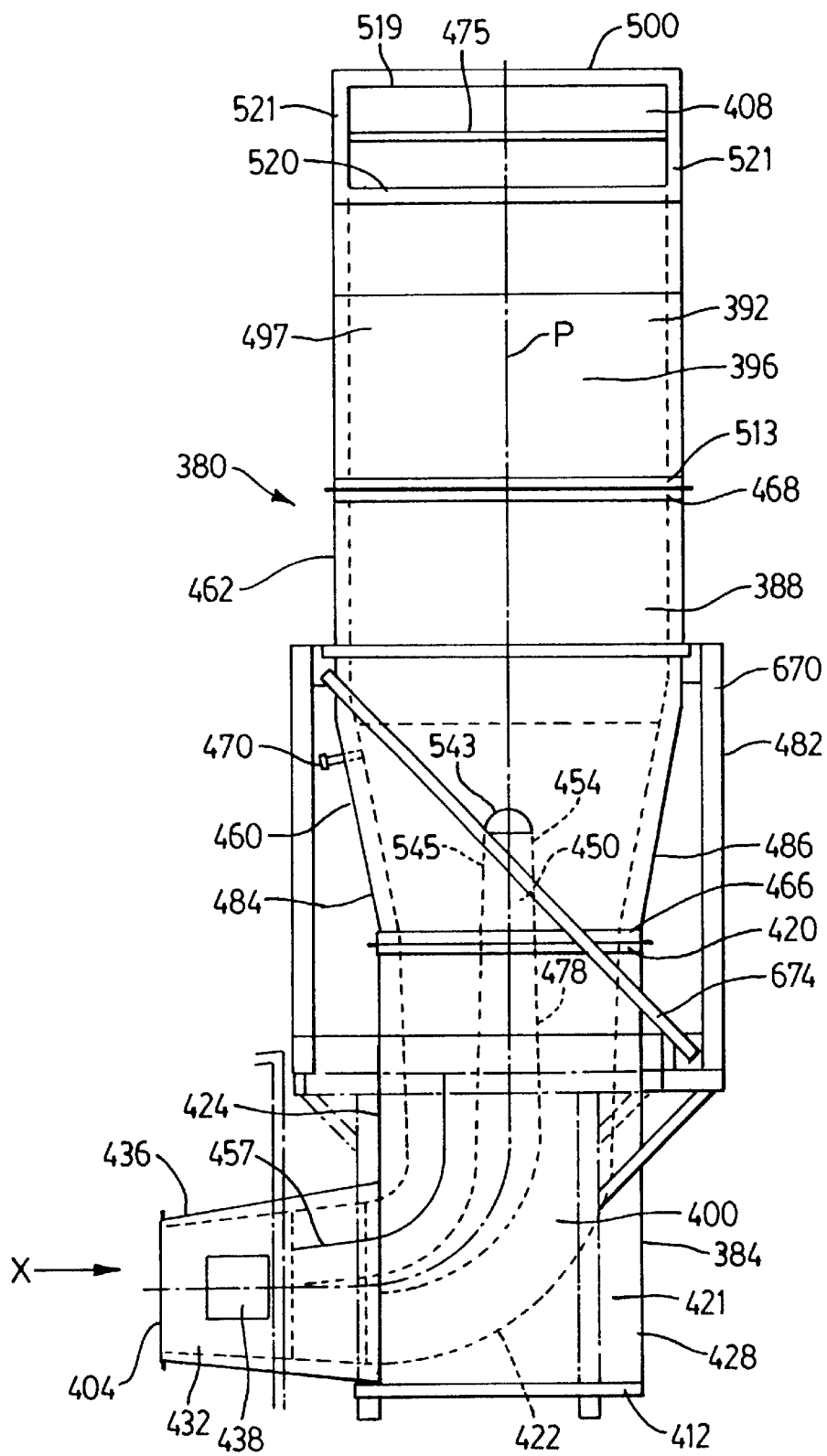
FIG. 11 is a first elevation view of a second embodiment of an air duct outlet silencer construction in accordance with the invention.

Reference will now be made to FIG. 11 which illustrates a second and preferred embodiment of a sound attenuating structure or sound attenuating duct unit 380 most suitable for the outlet of a gas turbine but also usable as an outlet silencer for other power plants producing hot emission gases and even for other noise-creating, gasflow-producing devices such as large axial fans for air handling. The illustrated sound attenuating structure 380 can be divided into three main parts or main sections which are elbow silencer 384, lower stack section 388 and upper stack section 392. The inner walls of the structure 380 surround a main airflow passageway 396 that extends through a substantial bend. The bend, which preferably is approximately 90 degrees, is located in section 400 of the passageway 396. There is a circular air inlet 404 located at one end of the elbow silencer 384 and adapted for connection to the outlet of the gas turbine 12 (FIG. 1). There are also two side discharge outlets 408 located proximate to an upper end of the upper stack section 392 (only one being shown in FIG. 11).

When assembled, one embodiment of the structure 380 has a height of about 32 feet (from drain cap 412 to the top of the upper stack section 392). The elbow silencer 384 weighs 8000 pounds in this particular embodiment and has a height of about 11 feet from the drain cap 412 to mating or bolting flange 420. The elbow silencer has an outer or exterior wall 421 shown in solid lines and an inner or interior wall 422 defining part of the airflow passageway 396 shown in dashed lines. From side 424 to side 428 of the outer wall, the horizontal separation between the two sides is 6 feet 4 inches. The elbow silencer 428 includes a horizontal housing section 432. The air inlet 404 is located at one end of the horizontal housing section 432. The length of the section 432 as measured from the inlet 404 to a point directly below the side 424 is 5 feet 2 inches. The horizontal housing section is rigidly attached to a vertical housing section of the sound attenuating structure 380. The vertical housing section surrounds the remainder of the main airflow passageway 396.

Gas flows into the horizontal housing section from the turbine in a horizontal direction X. In the transition section 432, the passage gradually and continuously expands. The passage also changes gradually from circular to rectangular (like the section 152 shown in FIG. 5). As the gas enters the section 432 at a very high pressure and velocity, pressure taps can be provided at 436 for measuring pressure. A removable man-way or cover 438 can be provided for repair and service purposes.

Figure 12:
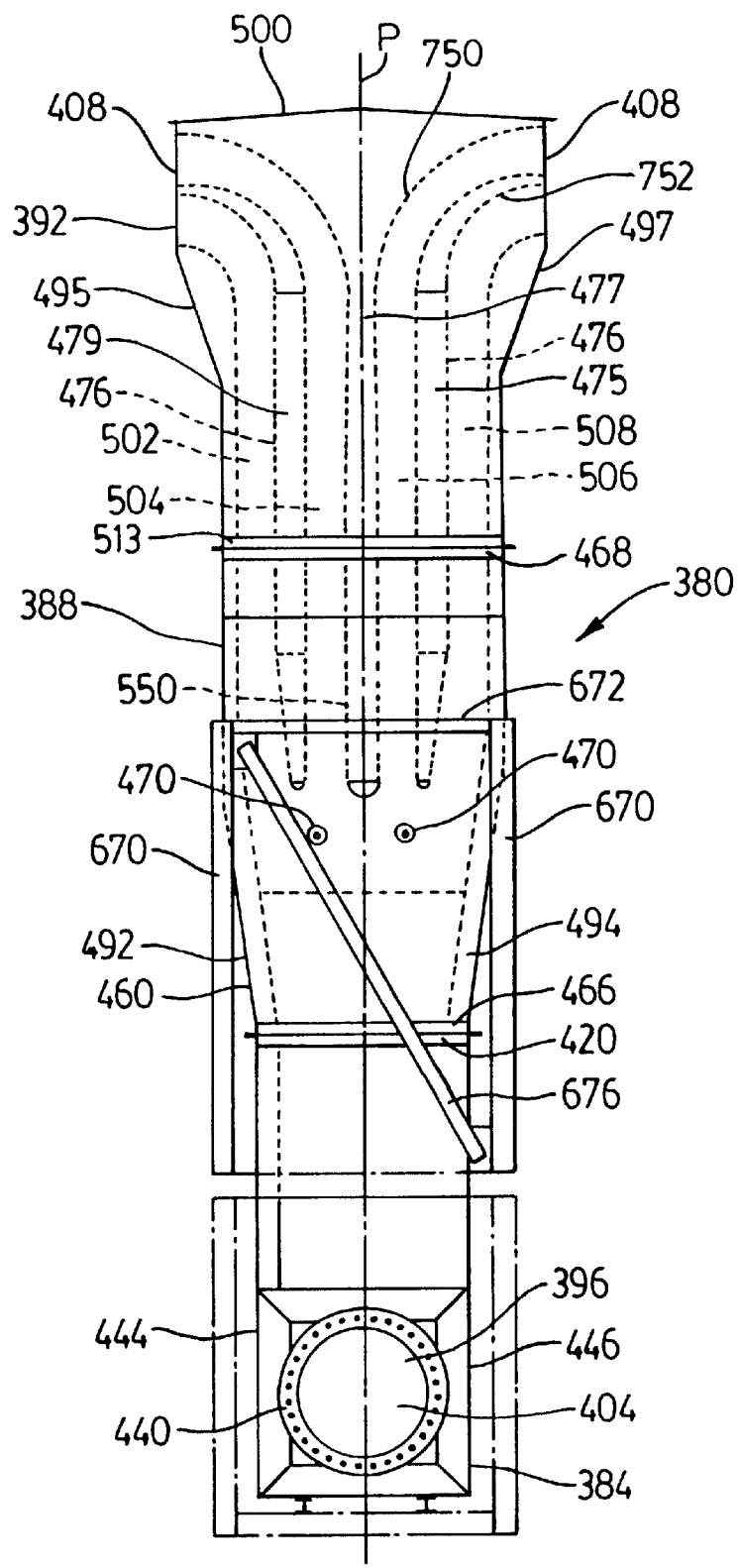
FIG. 12 is a second elevational view of the air duct outlet silencer construction of FIG. 11, this view being taken from the inlet side.

Referring to FIG. 12, which is another elevation view of the sound attenuating structure 380, a circular ceramic gasket 440 is provided at the inlet end of the elbow silencer 384. A number of bolt holes are provided in the gasket 440 (32 in the illustrated embodiment). Similar to the illustration in FIG. 5, the passage 396 of the structure 380 has a circular perimeter at the inlet 404, but gradually the perimeter becomes more rectangular in shape. Thus straight side 444 of the elbow silencer outer wall and opposite straight side 446 are at the downstream end of the horizontal transition section 432. A supporting structure (which is not fully illustrated) can be assembled around and attached to the exterior of the elbow silencer 384 to support it and the rest of the outlet attenuating structure either on the ground or a suitable horizontal floor.

Referring again to FIG. 11, in this embodiment a single and relatively large curved splitter 450 is contained substantially within the elbow silencer 384. The splitter 450 is positioned substantially in the center of the passage 396. Outer surface 454 of the splitter 450 curves in a parallel manner with the inner walls of the elbow silencer 384 as illustrated. As will be described, bracket devices for attaching the splitter 450 to exterior walls of the sound attenuating structure 380 are provided at the side edges of the splitter 450. A relatively thin turning vane 457 is positioned above the bottom and substantially horizontal portion of the splitter 450. The vane 457 is preferably a curved sheet of quarter inch thick stainless steel. Bracket devices for attaching the vane 457 to the exterior steel walls of the sound attenuating structure 380 can be provided at the sides of the vane 457 as explained below. As fluid may find its way to the bottom of the sound attenuating structure, a drain is provided at the bottom end of the structure. This drain includes two 2 inch drain pipes (not illustrated) which are vertically oriented, and the cap 412.

Figure 13:
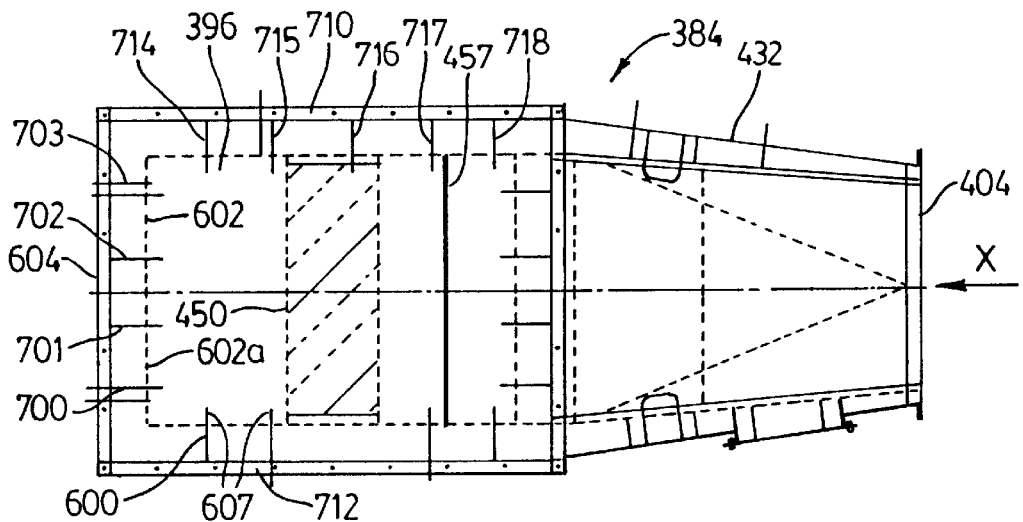
FIG. 13 is a plan view of the elbow silencer section of the air duct outlet silencer of FIG. 11.
Figure 14:
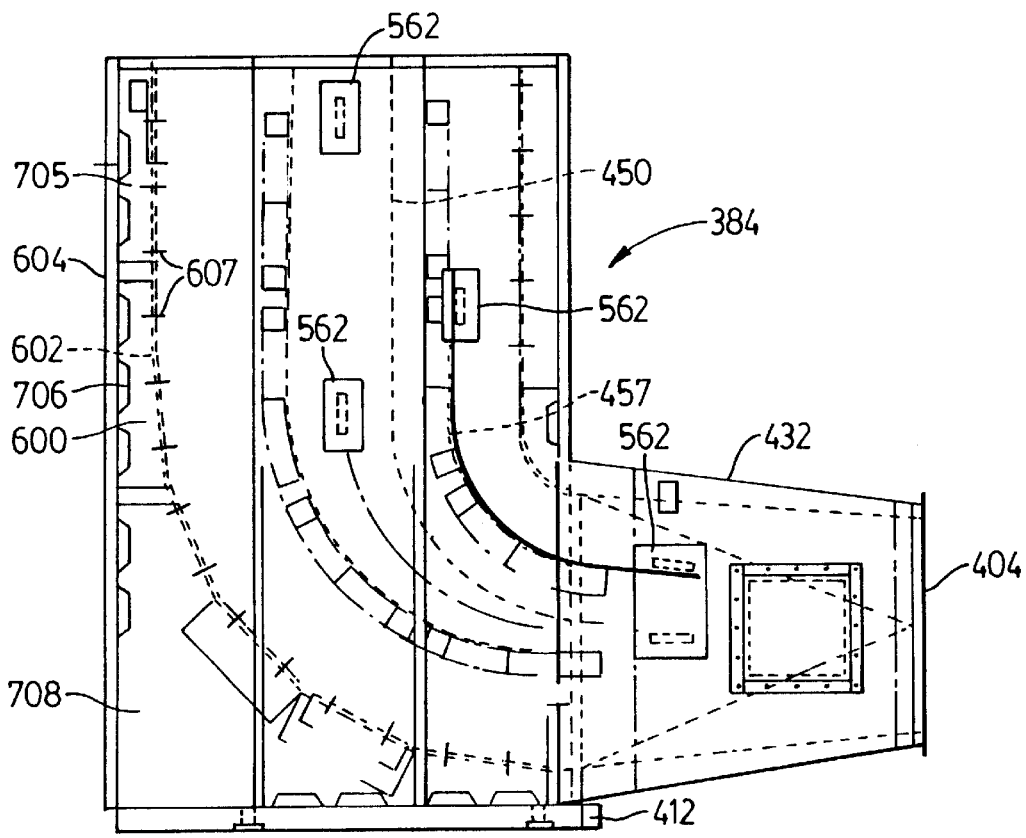
FIG. 14 is a side elevation of the elbow silencer section shown in FIG. 13.

FIGS. 13 and 14 illustrate the manner in which the perforated interior walls in the sound attenuating duct unit (in this case, the elbow silencer portion) can be attached to the solid metal exterior walls. In particular, this preferred attachment system includes metal mounting plates indicated generally by reference 600. These mounting plates have outer edges which are rigidly attached to the exterior walls 604, preferably by welding. The inner edges of these plates are detachably connected to the interior walls 602. The mounting plates can be arranged in spaced-apart, vertical rows as illustrated. For example, as illustrated in FIG. 13, there are four rows 700 to 703 of mounting plates used to mount the interior wall 602a which is a curved wall extending through an approximate 90 degree bend. Each of these rows is formed with at least three mounting plates, including an upper mounting plate 705, a middle mounting plate 706 and a much larger lower mounting plate 708. Extending along each of the two opposite side walls 710 and 712 of the airflow silencer (in the main vertical section thereof are five rows of mounting plates 714 to 718. Again, each of these rows may comprise several mounting plates arranged end to end. Mounting plates of this type are used to attach all of the interior walls of the elbow silencer to the exterior walls so that the interior walls will be able to move relative to the exterior walls as they thermally expand (as explained further hereinafter).

Also shown in FIG. 14 are spaced-apart connecting pins 607 which are used to attach the mounting plates to their respective interior walls 602. These connecting pins are rigidly attached to the respective plates such as by welding and, in the preferred embodiment, they extend from the inner edges of these plates and extend through oversized holes in the interior plates that are larger than the width of the pins.

Figure 15:
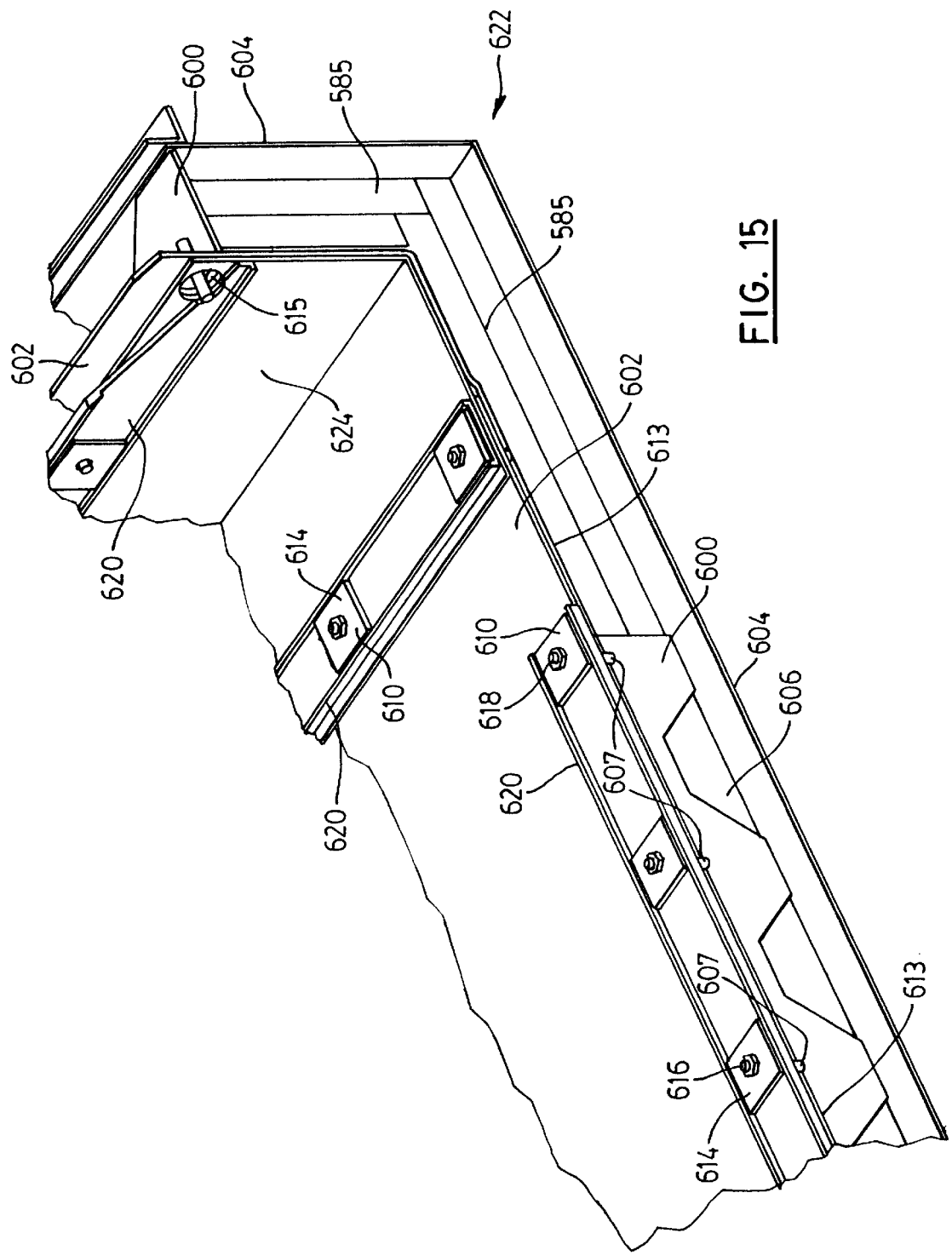
FIG. 15 is a perspective detail view of wall structure used in the outlet silencer of FIG. 11.
Figure 16:
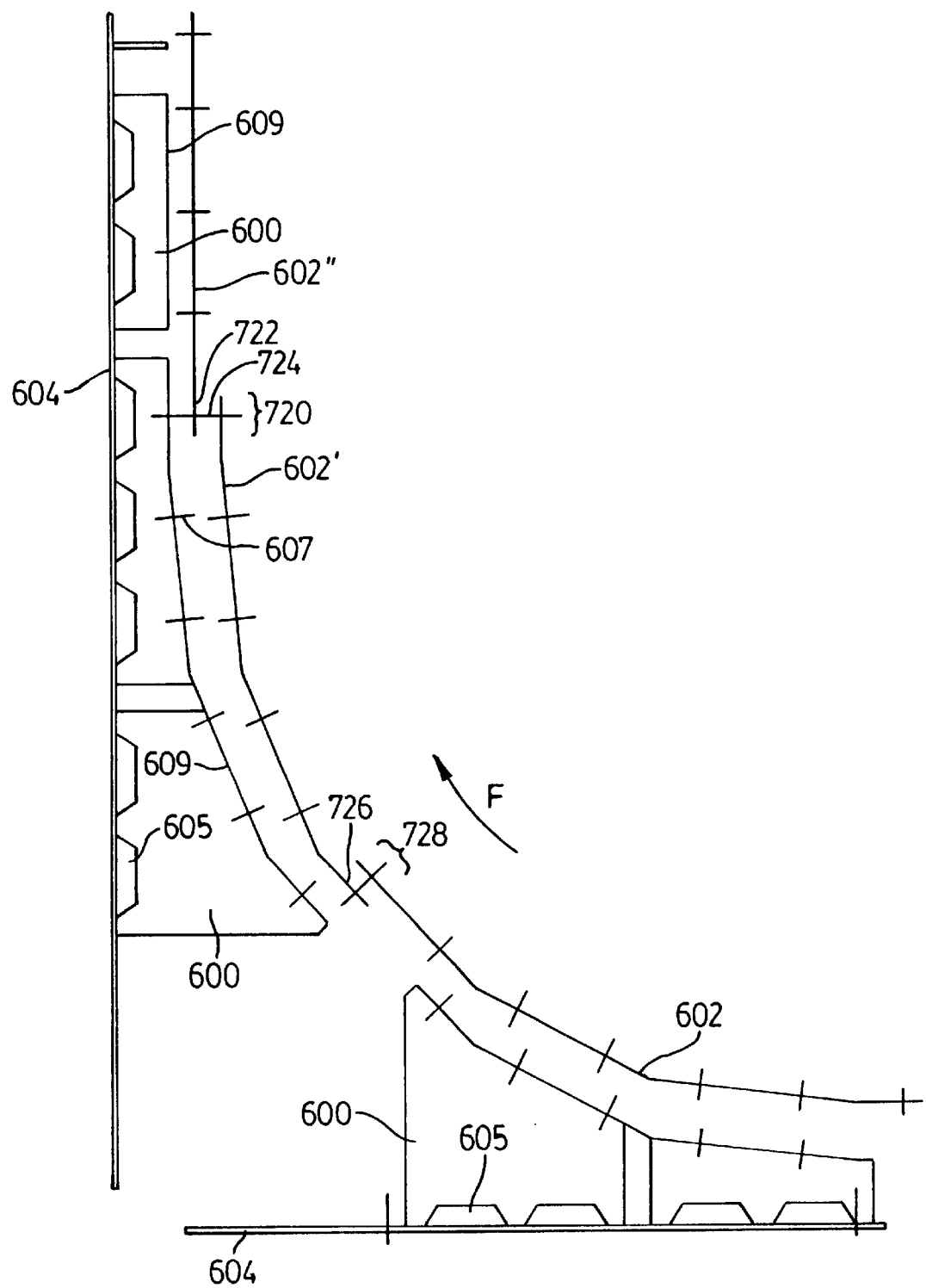
FIG. 16 is a schematic illustration in elevation showing how the perforated interior wall panels are mounted in the elbow silencer section.

FIG. 16 illustrates that in the preferred embodiment the interior wall panels 602 are arranged to overlap at their respective edges. FIG. 16 illustrates how these interior plates overlap in the direction of airflow indicated by the arrow F but it should be appreciated that the interior panels also overlap in the horizontal direction and at the corners of the interior walls. The purpose of the overlap is, of course, to prevent any gaps in the interior wall either as a result of thermal expansion or contraction. To explain further, it will be seen that there is an edge section at 720 of the interior wall panel 602'that overlaps and extends along a bottom edge section 722 of the interior panel 602". Both of these edge sections are formed with the oversized holes (shown in FIG. 15) in order to accommodate connecting pins 607 located at 724. Similarly, at the opposite, bottom edge of the interior panel 602', there is an edge strip at 726 which is overlapped by an upper edge section 728 of another interior panel.

The lower stack section 388 includes a gradually widening portion 460 and a rectangular shaped portion 462 of uniform width and cross-section. Spanning in the vertical direction from mating or bolting flange 466 to mating or bolting flange 468, the height of the lower stack in one embodiment section is about 11 feet and its weight is 9000 pounds. Two emission test ports 470 extend through the outer wall of the stack. The top section of the splitter 450 extends into the lower stack section and (with reference to FIG. 12) the bottom of three splitters 475, 477 and 479 extend into the lower stack section. At the mating flange 466 of the aforementioned preferred embodiment, side 484 of the stack outer wall is separated from sloping side 486 by a horizontal distance of 6 feet 4 inches. This horizontal separation gradually widens to 8 feet 4 inches. With respect to the other two sides of the outer wall (labeled 492 and 494 in FIG. 12), the horizontal separation between the sides increases from 4 feet 10 inches to 6 feet 4 inches in this particular embodiment.

The two outlets 408 are located in the upper stack section 392 and above sides 495 and 497 of the stack outer wall. The outlets 408 are proximate to an upper end of the vertical housing section. A closed, horizontally extending roof or top 500 is provided at the top of the stack. The roof 500 is preferably sloped so that water will not puddle on its surface. The top 500 keeps rain and other undesired matter from finding its way into the structure passage 396. It is therefore preferred to have the closed roof 500 and the two adjacent side discharge outlets 408 than an alternative arrangement where the outlet is at the top end of the stack facing upwardly.

Longitudinal axis P extends through the centre of the stack. The central splitter or airflow defining member 477 is aligned with and extends along the P axis. The outer splitters 475 and 479 are spaced apart from the central splitter and on opposite sides of both the P axis and the central splitter. Bracket devices for attaching the splitters 475, 477 and 479 to the exterior walls of the sound attenuating structure 380 are provided at the side edges of the splitters as will be explained below.

Unlike the embodiment of the sound attenuating structure illustrated in FIG. 5, the initial splitter 450 located below the downstream splitters 475, 477 and 479 is neither parallel to nor staggered relative to these latter three splitters. In addition, there is a difference in the orientation of these splitters. The downstream splitters have major lower portions 476 that extend in substantially parallel planes (in particular, vertical planes) that are substantially perpendicular to a central widthwise plane extending through the axis P and defined by an upper end portion 478 of the initial splitter 450. There are advantages to be gained by reorienting the downstream splitters in this manner. Firstly, it enables any suitable number of downstream splitters to be used because there is no need to stagger the splitters in the transverse direction relative to the initial splitter 450 (or splitters). It thus permits more flexibility in the design of the sound attenuating outlet structure. In addition, where the outlets 408 are in the opposite vertical sides, it is very desirable to have a central downstream splitter 477 and the orientation of the downstream splitters enables the outlet structure to have this central splitter. The splitters 475, 477 and 479 which are positioned downstream in the main airflow passageway relative to the splitter 450, divide the main passageway 396 into four narrower passageways 502, 504, 506 and 508. The individual widths of these four passageways is roughly equal to the transverse width of adjacent splitters (with respect to the region of the straight stack region below the curved region adjacent the outlets 408). As hot air flows up the stack, it is directed around the semi-cylindrical bottom ends of the splitters (these ends being covered with imperforate stainless steel). The hot air then flows up through the four narrow passageways to exit through the outlets 408 (the airflow at the outlets preferably having a velocity component in both the horizontal and vertical direction). The velocity of the exiting air will be sufficiently high to avoid excessive local pollution.

An upper portion 750 of the central splitter 477 extends upwardly from the lower portion 476 and its perforated metal exterior panels curve upwardly and outwardly to the top edges of the gas outlet 408. Each of the outer splitters 475, 479 has an upper portion 752 that curves upwardly and outwardly towards a respective one of the gas outlets 408. As illustrated, a tapered tail end of each splitter 475, 479 is located at the respective outlet 408 and is positioned in the vertical center of the outlet.

Referring to FIG. 12, in one preferred embodiment the horizontal separation between the sides 495 and 497 of the stack outer wall at mating or bolting flange 513 is 6 feet 4 inches. The horizontal separation gradually increases towards the top of the stack. Between the outlets 408, the horizontal separation is 8 feet 4 inches. The height of the upper stack section from the top 500 to the mating flange 513 is roughly 9 feet 10 inches. In this particular embodiment, the upper stack section is the heaviest of the three main sections weighting approximately 10,500 pounds. Each outlet 408 as measured between side edges 521 and top and bottom edges 519, 520 is 7 feet 8 inches by 2 feet 6 inches. A trailing edge of the splitter 475 is located at the illustrated outlet 408. This trailing edge extends horizontally between the edges 521. It will be appreciated that the outlet 408 is sufficiently large for animals like birds to find their way into the exhaust stack and therefore a bird screen (not shown) is preferably placed over both of the outlets 408.

Figure 18:
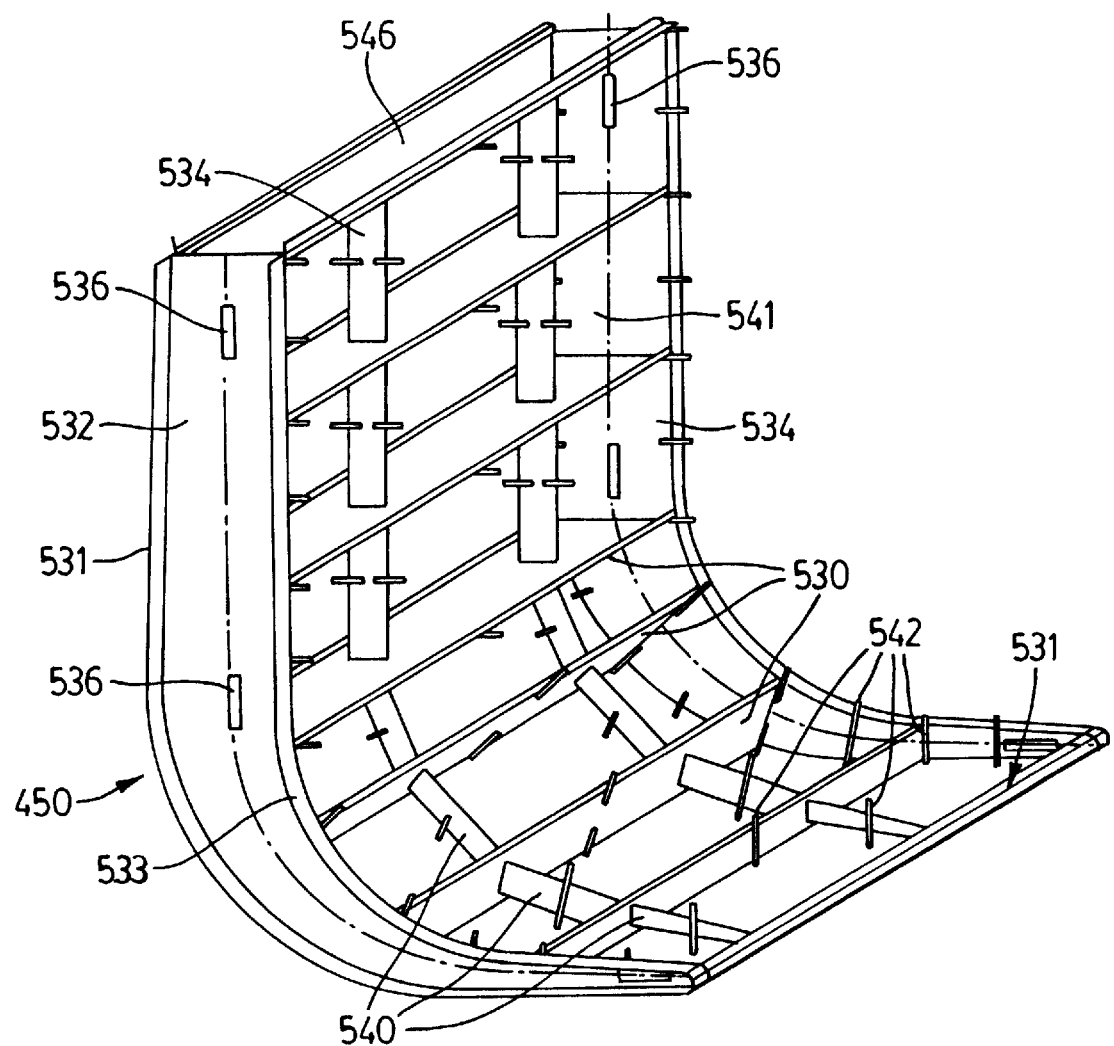
FIG. 18 is a perspective view of the metal shell for an elbow splitter used in the outlet silencer of FIG. 11.

FIG. 18 illustrates the main, curved section of the splitter 450 which extends through the elbow silencer 384 and which has a narrow, horizontal, leading edge 531. The splitter is illustrated without top and bottom 12 gauge, perforated stainless steel side walls attached. Metal side edge plates 532 and 534 of the splitter 450 do not have perforations in them. A number of interconnecting plates 530 extend between the sides 532 and 534 of the splitter 450. The horizontal separation between the sides 532 and 534 is the width of the splitter 450, which has outwardly projecting edge flanges 531, 533 on both side edges. A number of slots 536 are provided in the sides 532 and 534 for attaching the splitter 450 to the walls of the sound attenuating structure 380 as explained further below.

A number of smaller interconnecting plates 540 in combination with the larger plates 530 divide the interior of the splitter into a number of compartments 542. As shown, two plates 540 extend between and rigidly connect each pair of adjacent plates 530. In each of the compartments 541, a suitable sound attenuating insulation is placed. The insulation can comprise simply mineral wool or layers of fiberglass surrounded by mineral wool. Alternatively ceramic-type insulation can also be used. For gas turbine applications, the insulation should withstand high temperatures, for example, 500 degrees Celsius or more. The interconnecting plates which define the walls of the compartments help to hold the insulation in place. A large number of connecting pins 542 are welded to the sides 532 and 534 as well as to the interconnecting plates 530 and 540. The pins are used for attaching the perforated top and bottom walls of the splitter 450, these walls being formed with oversized round holes to receive the pins. The pins are also threaded to permit the attachment of nuts and suitable connecting plates (see the attachment system illustrated in FIG. 15 and explained below in detail). It is noted that the lengths of these threaded pins will vary, at least with respect to similar pins located in different locations within the sound attenuating structure 380. When the splitter 450 is fully assembled, a semi-cylindrical metal channel or rounded tail portion 543 made of imperforate stainless steel is attached to its top end as shown in FIG. 11. An end wall 546 can be provided to close off the curved section at its upper end (located adjacent to the flange 420).

As shown in FIG. 11, there is a relatively short section 545 of the splitter 450 located above the curved section and mounted in the stack section 388. The short section 545 is constructed in a manner similar to the illustrated curved section except for the noted differences. The two sections can be attached on site by means of bolts or other known fasteners.

Figure 19:
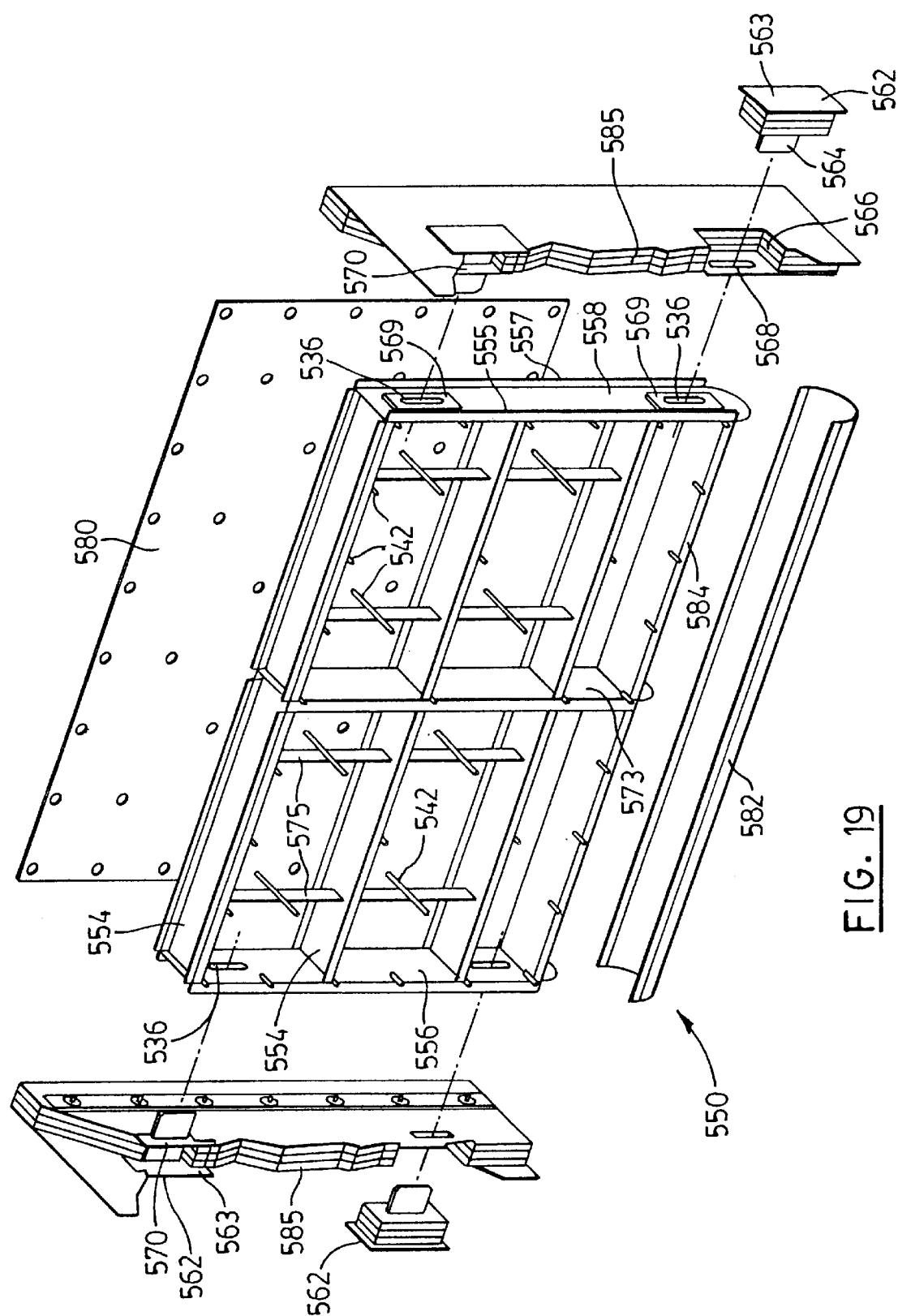
FIG. 19 is an exploded view of a stack splitter (without its sound attenuating material) and its mounting used in the outlet silencer of FIG. 11.

FIG. 19 illustrates a bottom portion 550 of the splitter 477 shown in FIG. 12. The horizontal separation between side edge plates 556 and 558 is the width of the splitters 475, 477 and 479. Each side edge plate has outwardly projecting edge flanges 555, 557 on its opposite long edges. The width of these three splitters is approximately 7 feet 7 inches in one preferred embodiment. Referring back to FIG. 11, the view of the splitter 450 in that figure is in a direction parallel with the width of that splitter. Referring back to FIG. 12, the view of the splitters 475, 477 and 479 in that figure is in a direction parallel to their widths. Therefore the width of the splitters 475, 477 and 479 extends in a horizontal direction at a substantial angle to the width of the splitter 450 and the vane 457, preferably an angle of 90 degrees about the P axis.

The side edge plates 556 and 558 are parallel and do not have perforations in them. Interconnecting plates 554 extend horizontally between the side plates 556 and 558. The connecting plates 554 are approximately 9 inches wide in one embodiment. Again slots or openings 536 are provided in the side plates 556 and 558 for attaching the splitter to exterior walls of the sound attenuating structure. This is accomplished by means of support brackets 562 which are attached at spaced-apart locations along the splitter side edges. The brackets 562 include a quarter inch thick steel plate 563 and a stainless steel tongue member 564. Each tongue member 564 is perpendicular to the plate 563 and extends through openings or slots 566, 568 and 536 provided in the stack outer wall, the stack inner wall and the side of the splitter respectively. Small rectangular 11 gauge stainless steel pieces 570 also having slots to accommodate the tongue members (to which they are attached) can be placed adjacent the slots 568 when the brackets 562 are put into position. The slots 536 provided in the splitter sides are formed in solid boxes 569 (see FIG. 20) which are made of stainless steel having a 12 gauge thickness. The solid boxes are rigidly attached to the splitter sides by welding. The support bracket and slots assembly just described along with being used to connect the splitter 477 to inner walls of the sound attenuating structure 380 is of course also used in association with the splitters 450, 475 and 479 for the same purpose. This form of connection allows the splitters to expand lengthwise quickly as they are heated up and avoids a breakage of the splitter supports.

Figure 20:
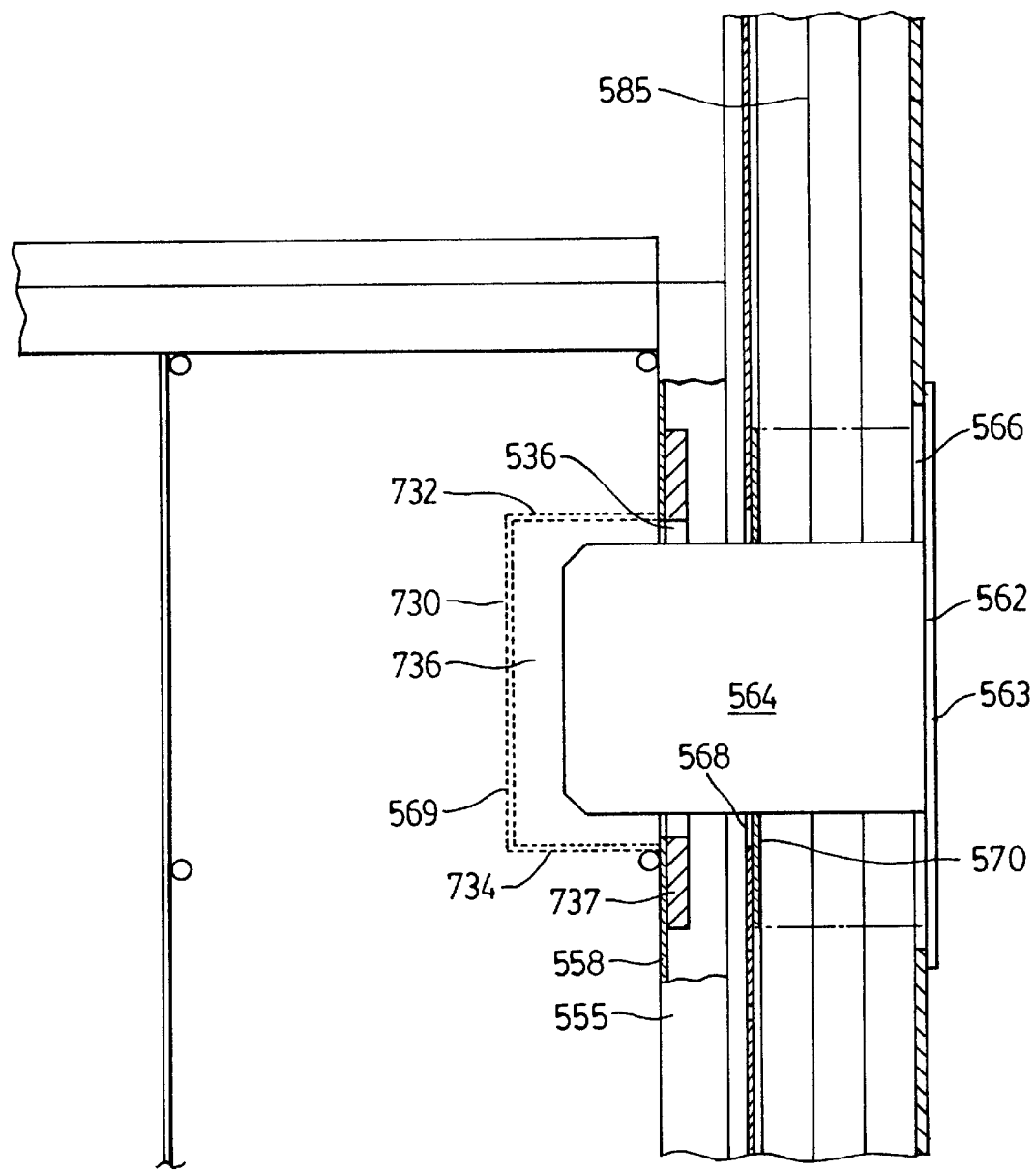
FIG. 20 is a cross-sectional elevation showing a bracket mounting arrangement used to mount each of the splitters.

FIG. 20 illustrates how a solid box can be constructed in the splitter to accommodate each of the inner ends of the brackets 562. The solid box 569 can be constructed of 12 gauge stainless steel and it extends inwardly from its respective side edge panel 558 or 556. The box includes inner end wall 730, top wall 732, bottom wall 734 and two opposite side walls 736 that extend between the top and bottom walls. The side of the box connected to the side edge panel is open in order to receive the inner end of the tongue member 564. It will be understood that the purpose of this box is to prevent sound attenuating material located in the splitter from escaping out through the side edge of the splitter. The slot formed by the box is, of course, large enough, particularly in the lengthwise direction to accommodate thermal expansion of the splitter. In order to provide sufficient structural integrity and strength for the bracket member to support the splitter, a thick, rectangular stainless steel plate 737 is provided on the outside of the side edge panel 558 and can be welded thereto. This plate also defines the aforementioned slot 536 through which the tongue member 564 extends.

As explained, the illustrated splitter of FIG. 19 is broken into a number of compartments for securing the insulation. The walls of the compartments are defined by the side edge panel 556, the side edge panel 558, metal divider 573, interconnecting horizontal plates 554 and smaller, vertical interconnecting plates 575. Again the pins 542 are welded to all or most of these members to permit attachment of 12 gauge perforated metal sheet 580 which forms an outer wall of the splitter. It will be appreciated that another similar 12 gauge metal sheet is attached on the opposite side of the splitter (not illustrated in this figure). Imperforate stainless steel channel or rounded nose portion 582 is attached to bottom end 584 of the splitter. The rounded nose portion 582 is at the leading edge of the splitter.

The metal sheet 580 is made from stainless steel. It will be appreciated that all of the perforated metal sheets or panels which are exposed to the exhaust of the turbine are preferably stainless steel, because ordinary steel will corrode too much. Also these perforated steel sheets preferably have an open area of at least 30% of the total sheet area of the respective sheet. While the inner walls of the sound attenuating structure 380 are 11 or 12 gauge stainless steel panels, the outer walls of the structure 380 are preferably mild steel panels having a quarter inch thickness for strength and rigidity. Adjacent panels of the inner or outer walls can of course be welded together where a permanent attachment is acceptable. In any particular region of the structure 380, the horizontal separation between the neighboring inner and outer walls of the structure 380 can be as little as 4 inches, or as much as 6 inches.

Along with insulation being contained in the splitters of the sound attenuating structure, sound attenuating insulation 585 extends through the entire structure 380 between the interior and the exterior walls of the structure. What is suitable for insulation in all of these regions has already been discussed.

FIGS. 15 and 16 illustrate metal mounting plates or scallop members 600 which are used to securely attach the perforated inner walls 602 of the sound attenuating structure to outer walls 604 of the structure. Scallop members 600 are used throughout the sound attenuating structure 380 to attach walls exposed to the hot airflow to unexposed walls. It is desirable to minimize the heat transfer between walls exposed to the hot airflow and the unexposed walls and the scallop members 600 are designed to achieve this objective, while still providing a good attachment between the inner and outer walls of the structure 380.

The scallop members 600 for the most part extend perpendicular to the walls 602 and 604; however they will vary in size and shape as illustrated in FIG. 16. For example, scallop members just above the drain cap 412 will naturally be larger than the scallop members located in the upper section of the exhaust stack because of a difference in inner/outer wall separation between the two regions. The scallop plates are preferably welded to the outer walls 604. Each of the scallop plates 600 has an edge 606 formed with a series of spaced-apart recesses 605 and an opposite edge 609 (not visible in FIG. 15) which can be straight, angled, or bent depending on the particular location of the plate 600. The 609 edge extends along and is flush with the inner wall 602. Pins 607 are welded to each scallop plate 600, and extend past the inner edge of the scallop plate to be used in conjunction with attachment assemblies or devices 610 for securing the interior walls 602 to the scallop plates. These pins 607 have threaded inner end sections.

Each of the assemblies 610 includes a connecting plate 614 in the form of a metal square and a nut 616. Each plate 614 has a hole for receiving an inner end 618 of a respective one of the connecting pins 607. The nut 616 attaches the plate 614 to its pin 607 by a threaded attachment. The metal squares extend over and close large or oversized holes 615 formed in both the inner walls 602 and connecting channel members 620. Each channel member 620 has a series of these oversized holes which are aligned with the holes in the adjacent interior wall. The elongate channel members 620 extend between the squares of the assemblies 610 and act as clamping members to hold the inner wall between them and the scallop plates. In the corner region 622, a stainless steel elongate corner piece 624 is employed. The piece 624 is securely attached to the adjacent and overlapping perforated sheets of the inner walls 602 by the assemblies 610 and two of the channel members 620. In the upper and lower stack section, the interior walls 602 are spaced apart from the exterior walls 604 by means of these scallop plates 600 by roughly 4 to 6 inches.

It has been found that even though the metal squares of the assembly 610 cover the large holes of the inner walls 602, insulation or sound attenuating material between the walls may escape their compartments through the small holes in the perforated interior walls. As indicated, it is desirable to use a very fine metal screen between the walls to keep the insulation from escaping. Stainless steel is a suitable metal for this screen which is located directly under or out from the inner walls 602. The location of this screen 613 is indicated in FIG. 15. The threads of one suitable metal screen are about one thousandths of an inch thick, with the metal screen having 200 to 240 strands per inch. With respect to the splitters of the structure 380, the same screen will achieve the same result with respect to sound attenuating material contained in the splitters.

Figure 17:
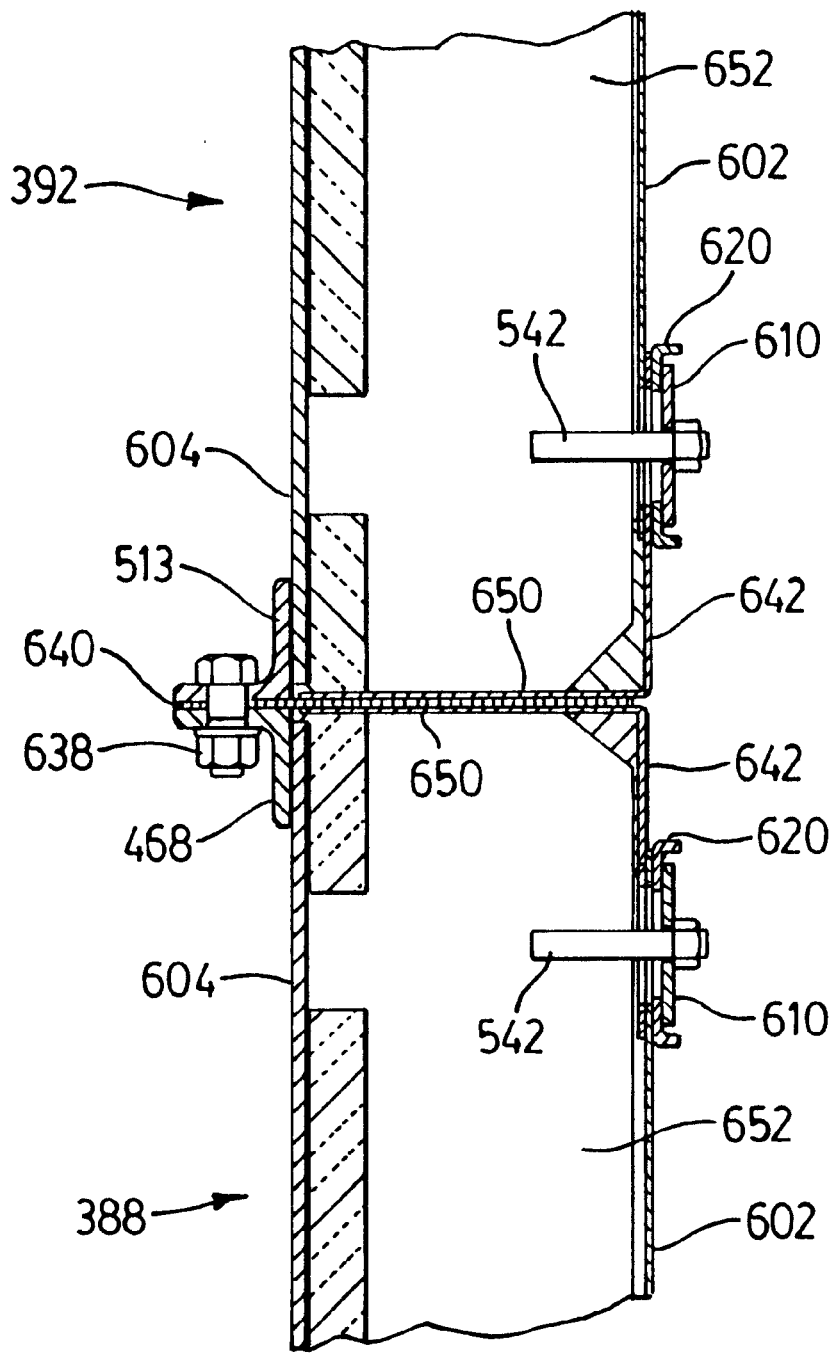
FIG. 17 is a detail view in cross-section showing a portion of the wall structure used in the outlet silencer of FIG. 11 and in a transition region between sections.

FIG. 17, which is another cross-sectional illustration of wall structure used in the sound attenuating structure 380, illustrates how the large sections of the structure 380 are joined to each other. The illustrated large structure sections are the upper stack section 392 and the lower stack section 388. The mating or bolting flange 513 extends completely around the outside perimeter of the section 392. The stack section 388 also has the mating or bolting flange 468 extending around its outside perimeter. Both of the flanges 468 and 513 can be welded to the outer walls 604. A number of fastener assemblies 638, which are bolts with nuts and washers, are used at spaced apart locations to attach the section 392 to the section 388. An ⅛th inch thermoglass gasket 640 is sandwiched between the flanges 513 and 468. This gasket extends along the entire lower edge of the stack section 392, to form a good continuous seal that prevents the escape of the hot gases through the joint.

Elongate angle pieces 642 are securely attached to the inner walls 602 by the assemblies 610 and channel member 620 which were described previously. In FIG. 17, the two illustrated pins 542 are vertically separated by 8½ inches. The pins 542 are also welded to scallop plates 652 which are similar to the plates 600 described above. The scallop plates 652 are made of 11 gauge stainless steel. Sides 650 of the angle pieces 642 extend horizontally and outwardly towards the outer walls 604 but are not connected to the outer walls. Adjacent the sides 650 are ends of the scallop plates 652. Sandwiched between the sides 650 is a major portion of the thermoglass gasket 640.

Referring to FIGS. 11 and 12, a support structure 482 is assembled around as well as connected to the lower stack section to support and maintain the position of the exhaust stack. The illustrated support structure includes four vertical posts 670, horizontal connecting frame members 672 and cross pieces 674, 676. Not all of the support structure which is assembled around the sound attenuating duct unit 380 is illustrated in FIGS. 11 and 12, as a variety of support structures are possible and can be constructed readily by one skilled in the art of frameworks for supporting duct structures.

It will be understood by those skilled in the art that various modifications and changes can be made to both the preferred inlet silencer and the outlet silencer as described above without departing from the spirit and scope of this invention. Both the inlet silencer and the outlet silencer can be made relatively compact so as to take up a smaller area or distance than previously known silencer constructions. Various measurements of dimension and weight have been provided, but variations in the weights and dimensions of various parts of the inlet and outlet silencer structures are to be expected for different power generating or fan installations. As an example, the stack of the outlet silencing structure could be made shorter if necessary to deal with building constraints or it can be made longer to satisfy environmental and/or noise concerns. The number of splitters in the outlet duct silencer can vary substantially depending on the job or site requirements. For example, there could be a single splitter only in the duct unit, particularly if a large degree of sound reduction is not required. Accordingly all such modifications and changes as fall within the scope of the appended claims are intended to be part of this invention.

We claim:

1. A sound attenuating duct unit suitable for connecting to an outlet of a stationary gas turbine, said duct unit comprising:

a housing having a horizontal housing section and a vertical housing section and having sidewalls surrounding a main airflow passageway that extends along a substantial bend, an air inlet located at one end of said horizontal housing section and adapted for connection to said outlet of the gas turbine, and at least one air outlet located at least proximate to an upper end of said vertical housing section; and at least two splitters mounted in said housing, said splitters dividing sections of said main airflow passageway into smaller air passageways with at least one of said at least two splitters being positioned downstream in said main airflow passageway relative to at least another of said at least two splitters, said at least two splitters containing sound attenuating material selected from a group of materials comprising ceramic fibers and mineral wool and capable of withstanding airflow temperatures in said main airflow passageway of at least 500 degrees Celsius, said at least two splitters each containing a fine metal screen having 200 or more strands per inch and covering the sound attenuating material, said metal screen being provided to prevent said sound attenuating material from escaping said at least two splitters, wherein at least a substantial portion of both said sidewalls surrounding the main airflow passageway and metal sidewalls forming said splitters are made of perforated sheet metal having a thickness of at least 12 gauge.

2. A sound attenuating duct unit according to claim 1 wherein sound attenuating material is arranged in said sidewalls surrounding the main airflow passageway and is covered by the perforated sheet metal, which is made of stainless steel, and a layer of fine stainless steel screen is arranged directly behind said perforated sheet metal of said sidewalls to prevent escape of said sound attenuating material through said perforated sheet metal.

3. A sound attenuating duct unit according to claim 1 wherein said perforated sheet metal is made of stainless steel.

4. A sound attenuating duct unit according to claim 1 wherein said at least one of said two splitters extends through a substantial bend from a leading edge thereof to a trailing edge thereof.

5. A sound attenuating duct unit according to claim 1 wherein the horizontal width of said at least one of said splitters is substantially perpendicular to the corresponding horizontal width of said at least another of said splitters.

6. A sound attenuating duct unit according to claim 1 wherein said horizontal housing section includes a duct transition section extending approximately between said air inlet, which is circular, and a transverse, vertical plane located along and extending across said main airflow passageway approximately where a leading edge of said at least another of said splitters is positioned, and wherein the transverse cross-section of said main airflow passageway changes gradually from circular to rectangular in said duct transition section.

7. A combination of a gas turbine intended for installation and use at a stationary site and a sound attenuating duct unit connectable to a hot air exhaust outlet of said gas turbine, said duct unit comprising:

a housing having a horizontal housing section and a vertical housing section and having sidewalls surrounding a main airflow passageway that extends along a substantial bend, an air inlet located at one end of said horizontal housing section and connectable to said exhaust outlet of the gas turbine, and at least one air outlet located at least proximate to an upper end of said vertical housing section; and at least two splitters mounted in said housing, said splitters dividing sections of said main airflow passageway into smaller air passageways with at least one of said at least two splitters being positioned downstream in said main airflow passageway relative to at least another of said at least two splitters, said splitters containing sound attenuating material selected from a group of materials comprising mineral wool and ceramic fibers and capable of withstanding airflow temperatures in said main airflow passageway of at least 500 degrees Celsius, a layer of a fine stainless steel screen having 200 or more strands per inch being arranged over said sound attenuating material so as to prevent escape of said sound attenuating material into said main airflow passageway, wherein at least a substantial portion of both said sidewalls surrounding the main airflow passageway and metal sidewalls forming the splitters are made of perforated sheet metal and said screen is arranged behind the perforated sheet metal of the splitters.

8. The combination of claim 7 wherein said gas turbine is elongate and has a central longitudinal axis about which blades of the gas turbine rotate during use of the gas turbine, said central longitudinal axis of the gas turbine being substantially horizontal, and wherein both said sidewalls surrounding said main airflow passageway and the metal sidewalls of said splitters are made of perforated stainless steel sheet having a thickness of at least 12 gauge.

9. The combination of claim 7 further comprising a turning vane positioned within said main airflow passageway and above a substantially horizontal portion of said at least another of said splitters, wherein said at least one of said splitters comprises three splitters and said at least another of said splitters is a single curved splitter.

10. A sound attenuating duct unit suitable for connecting to an outlet of a stationary gas turbine, said duct unit comprising:

a housing having a horizontal housing section and a vertical housing section and having sidewalls surrounding a main airflow passageway that extends along a substantial bend, an air inlet located at one end of said horizontal housing section and adapted for connection to said outlet of the gas turbine, and two spaced-apart and vertically extending side air outlets located proximate to an upper end of said vertical housing section, said vertical housing section having a top located above said air outlets and adapted to keep rain out of said airflow passageway; and at least for splitters mounted in said housing, said splitters dividing sections of said main airflow passageway into smaller air passageways with three of said splitters being positioned downstream in said main airflow passageway relative to at least another of said at least four splitters, the three downstream splitters including a central splitter extending along a central longitudinal axis of the vertical housing section and two outer splitters extending along opposite sides of said central splitter and spaced therefrom, wherein said splitters contain sound attenuating material capable of withstanding airflow temperatures in said main airflow passageway of at least 500 degrees Celsius and at least a substantial portion of both said sidewalls surrounding the main airflow passageway and metal sidewalls forming said splitters are made of perforated sheet metal.

11. A sound attenuating duct unit according to claim 10 further comprising a curved stainless steel turning vane positioned within said main airflow passageway and above a substantially horizontal portion of said at least another of said splitters, wherein said at least another of said splitters is a single splitter.

12. A sound attenuating duct unit according to claim 11 wherein top portions of said three splitters are curved in the direction of airflow so that hot air exiting from said air outlets has a substantial velocity component in both horizontal and vertical directions.

13. A sound attenuating duct unit according to claim 10 wherein each splitter extends widthwise from one sidewall of said housing to an opposite sidewall and the width of said three downstream splitters extends in a horizontal direction that is substantially perpendicular to the width of said at least another splitter.

14. A sound attenuating duct unit suitable for connection to an outlet of a stationary gas turbine, said duct unit comprising:

a housing having exterior walls, perforated metal interior walls forming a main airflow passageway and mounted on and supported by said exterior walls, a hot gas inlet at one end of said housing and adapted for connection to said outlet of the gas turbine, and at least one gas outlet, said main airflow passageway extending between said gas inlet and said at least one gas outlet;

sound attenuating members mounted within said main airflow passageway and supported therein by said housing;

sound attenuating material arranged in said housing between said interior walls and said exterior walls and capable of withstanding high airflow temperatures generated at the outlet of said gas turbine during use thereof;

metal mounting plates having outer edges connected to said exterior walls and inner edges connected to said interior walls;

spaced-apart connecting pins attached to said mounting plates, projecting from said inner edges, and extending through oversized holes that are larger than the widths of the pins, said holes being formed in said interior walls;

and an attachment device for movably connecting each connecting pin to a respective one of said interior walls, wherein, when said interior walls are heated to an elevated high temperature by operation of said gas turbine, said interior walls are able to expand and move relative to said exterior walls while remaining securely attached to and supported by said exterior walls via said connecting pins and metal mounting plates.

15. A sound attenuating duct unit according to claim 14 wherein said mounting plates are rigidly attached to said exterior walls of the housing.

16. A sound attenuating duct unit according to claim 14 wherein each outer edge of at least some of said metal mounting plates is formed with a two or more spaced-apart recesses in order to reduce the length of contacting edge where the respective mounting plate is connected to its adjacent exterior wall.

17. A sound attenuating duct unit according to claim 15 wherein said connecting pins have threaded inner ends and said attachment device comprises a connecting plate having a hole for receiving the inner end of a respective one of said connecting pins and a nut for attaching said connecting plate to the connecting pin by threaded attachment to the connecting pin.

18. A sound attenuating duct unit according to claim 17 including elongate channel members having a series of further oversized holes formed therein and aligned with respective ones of said oversized holes formed in said interior walls, wherein the connecting pins attached to each mounting plate extend through both the oversized holes in an adjacent one of said interior walls and the aligned further holes of a respective one of said channel members and the attachment devices act to clamp each of said channel members to its respective adjacent interior wall.

19. A sound attenuating duct unit according to claim 14 wherein said housing is constructed from at least three separate sections that are detachably connected together, said three sections including an elbow silencer section having both a horizontal portion and a vertical portion, a lower stack section attached to an upper end of said vertical portion, and an upper stack section attached to an upper end of said lower stack section, said main airflow passageway extending through all three of said separate sections and said hot gas inlet being located at one end of said horizontal portion.

20. A sound attenuating duct unit according to claim 14 wherein said sound attenuating members are splitters dividing said main airflow passageway into smaller airflow passageways and containing sound attenuating material capable of withstanding high airflow temperatures, the exterior of each splitter being made from perforated sheet metal.

21. A sound attenuating duct unit according to claim 20 including splitter mounting devices for connecting each splitter to two of said exterior walls of the housing, wherein said splitter mounting devices for each splitter are connected to the splitter so as to allow thermal expansion of the splitter when the duct unit is heated up by operation of said gas turbine without placement of further stress on the mounting devices.

22. A sound attenuating duct unit suitable for connection to an outlet for hot emission gases produced by a power plant, said duct unit comprising:

a metal housing formed with side walls containing sound attenuating material capable of withstanding high airflow temperatures and forming a main airflow passageway for said hot emission gases, said housing having a gas inlet at one end of the housing and at least one air outlet at an opposite end of the housing, said airflow passageway extending between said gas inlet and said at least one gas outlet, said side walls of the housing including exterior wall panels and perforated interior wall panels spaced-apart from and supported by the exterior wall panels, said sound attenuating material being sandwiched between said exterior wall panels and the interior panels;

at least one elongate sound attenuating splitter mounted in said main airflow passageway, extending between and supported by two of said side walls located on opposite sides of said housing, and dividing said main airflow passageway into elongate smaller airflow passageways, the or each splitter containing sound attenuating material and having an exterior constructed with perforated sheet metal; and splitter mounting devices connecting opposite sides of said at least one splitter directly to the exterior wall panels of said two side walls so as to allow thermal expansion of the at least one splitter when said duct unit is heated up by said hot emission gases during operation of said power plant.

23. A sound attenuating duct unit according to claim 22 wherein each splitter mounting device comprises a bracket rigidly attached to its respective exterior wall of said housing and having an inwardly projecting tongue, and wherein the or each splitter has side edge plates provided with elongate openings receiving the tongues of the respective brackets for the splitter, each tongue being movable relative to its respective elongate opening upon thermal expansion of the adjacent, attached splitter.

24. A sound attenuating duct unit according to claim 23 wherein there are a plurality of said at least one sound attenuating splitter including three splitters arranged side-by-side forming four of said smaller airflow passageways.

25. A sound attenuating duct unit according to claim 23 wherein there are two of said at least one gas outlet located on opposite vertical sides of said metal housing and said metal housing has a closed top adjacent to the two gas outlets and extending horizontally over the main airflow passageway.

26. A sound attenuating duct unit according to claim 22 wherein said splitter mounting devices project respectively through the adjacent interior wall panels which extend substantially parallel to said exterior wall panels of said two side walls.

27. A sound attenuating duct unit according to claim 26 wherein each splitter mounting device comprises a bracket rigidly attached to a respective adjacent exterior wall panel and having an inwardly projecting tongue that projects through an opening in a respective, adjacent interior wall panel, and wherein the or each splitter has side edge plates forming its opposite side edges and each side edge plate has elongate openings for receiving the tongues of the respective brackets for the splitter, each tongue being movable relative to its respective elongate openings upon thermal expansion of the adjacent attached splitter.

28. A sound attenuating duct unit according to claim 22 wherein there are a plurality of said at least one sound attenuating splitter including a first splitter located substantially centrally in said main airflow passageway and having a leading edge in the region of said gas inlet and further splitters located downstream of said first splitter and arranged side-by-side one another.

29. A sound attenuating duct unit suitable for connection to an outlet of a noise creating, gasflow producing device, said duct unit comprising:

a housing having a horizontal housing section and a vertical housing section and having sound attenuating sidewalls surrounding a main airflow passageway that extends along a substantial bend extending between the two housing sections, a gas inlet located at one end of said horizontal housing section and adapted for connection to said outlet of the gasflow-producing device, and at least one gas outlet located at least proximate to an upper end of said vertical housing section;

at least one initial, sound attenuating splitter mounted in said housing having an upstream end in the region of said gas inlet, and extending lengthwise around said substantial bend; and a plurality of spaced-apart, sound attenuating, downstream splitters dividing said main airflow passageway into smaller airflow passageways and arranged side-by-side one another, said downstream splitters being located downstream in the direction of gasflow from said at least one initial splitter and having major lower portions extending in substantially parallel planes that are substantially perpendicular to a central widthwise extending plane defined by an upper end portion of said at least one initial, sound attenuating splitter.

30. A sound attenuating duct unit according to claim 29 wherein there is only one initial, sound attenuating splitter which is arranged substantially centrally in said main airflow passageway and there are three of said downstream splitters and each of said splitters contains sound attenuating material capable of withstanding gasflow temperatures of at least 500 degrees Celsius.

31. A sound attenuating duct unit according to claim 30 wherein said housing has two gas outlets located at least proximate to said upper end of the vertical housing section and on opposite sides thereof, and said housing has a closed, horizontally extending top.

32. A sound attenuating duct unit according to claim 31 wherein said three downstream splitters include a central downstream splitter and two outer splitters located on opposite sides of said central downstream splitter, and central downstream splitter has a straight major lower portion and an upper portion with a perforated metal exterior that curves upwardly and outwardly to a top of each gas outlet, and each other splitter has a straight major lower portion and an upper portion that curves upwardly and outwardly towards a respective one of said gas outlets.

33. A sound attenuating duct unit according to claim 29 wherein said sound attenuating material is selected from a group of materials comprising mineral wool and ceramic fibers and said sound attenuating material is covered on a side thereof facing the gas flow by a very fine metal screen that prevents erosion of said sound attenuating material.

34. A sound attenuating duct unit according to claim 29 including splitter mounting devices for mounting all of said splitters to said sound attenuating sidewalls of the housing, the mounting devices for each splitter allowing thermal expansion of the respective splitter when said duct unit is heated up by hot emission gases from said gasflow-producing device during operation thereof.

35. A sound attenuating duct unit according to claim 34 wherein said sound attenuating sidewalls include imperforate exterior wall panels, perforated interior wall panels spaced-apart from and supported by the exterior wall panels, and sound attenuating material sandwiched between said exterior wall panels and said interior wall panels, and wherein said splitter mounting devices are rigidly attached to respective ones of said exterior wall panels and extend through their respective adjacent interior wall panels.

* * * * *